US012007474B2

(12) United States Patent
Vijayalingam et al.

(10) Patent No.: US 12,007,474 B2
(45) Date of Patent: Jun. 11, 2024

(54) AUTONOMOUS VEHICLE OPERATION USING ACOUSTIC MODALITIES

(71) Applicant: Motional AD LLC, Boston, MA (US)

(72) Inventors: Aravindkumar Vijayalingam, Singapore (SG); Abhimanyu Singh, Singapore (SG)

(73) Assignee: Motional AD LLC, Boston, MA (US)

( * ) Notice: Subject to any disclaimer, the term of this patent is extended or adjusted under 35 U.S.C. 154(b) by 820 days.

(21) Appl. No.: 16/885,385

(22) Filed: May 28, 2020

(65) Prior Publication Data

US 2020/0379108 A1    Dec. 3, 2020

Related U.S. Application Data

(60) Provisional application No. 62/853,345, filed on May 28, 2019.

(51) Int. Cl.
*G01S 15/931* (2020.01)
*G01S 3/80* (2006.01)
(Continued)

(52) U.S. Cl.
CPC .............. *G01S 15/931* (2013.01); *G01S 3/80* (2013.01); *G01S 5/0252* (2013.01);
(Continued)

(58) Field of Classification Search
CPC ...... G01S 15/931; G01S 5/02528; G01S 3/80; G01S 5/0252; G06F 16/60; G06F 16/65;
(Continued)

(56) References Cited

U.S. PATENT DOCUMENTS 6,173,074 B1 * 1/2001 Russo ................ G01H 3/08
382/190
10,324,182 B2 * 6/2019 Bariant ................ G01S 15/931
(Continued)

OTHER PUBLICATIONS

Yan Ke, D. Hoiem and R. Sukthankar, "Computer vision for music identification," 2005 IEEE Computer Society Conference on Computer Vision and Pattern Recognition (CVPR'05), San Diego, CA, USA, 2005, pp. 597-604 vol. 1 (Year: 2005).*
(Continued)

*Primary Examiner* — Isam A Alsomiri
*Assistant Examiner* — Joseph C Fritchman
(74) *Attorney, Agent, or Firm* — Fish & Richardson P.C.

(57) ABSTRACT

Techniques for autonomous vehicle operation using acoustic modalities include using one or more acoustic sensors of a vehicle to receive acoustic waves from one or more objects. The acoustic waves have multiple wavelengths. The acoustic waves are clustered into one or more acoustic clusters based on the plurality of wavelengths. A particular acoustic cluster of the one or more acoustic clusters is selected based on signal processing of the one or more acoustic clusters. A particular object is associated with the particular acoustic cluster. An acoustic fingerprint of the particular object is generated based on the particular acoustic cluster. Characteristics of the particular object are determined based on the acoustic fingerprint of the particular object. A control circuit of the vehicle is used to operate the vehicle to avoid a collision with the particular object based on the characteristics of the particular object.

20 Claims, 20 Drawing Sheets

(51) Int. Cl.

| | |
|---|---|
| *G01S 5/02* | (2010.01) |
| *G05D 1/00* | (2006.01) |
| *G06F 16/60* | (2019.01) |
| *G06F 16/65* | (2019.01) |
| *G06F 18/23* | (2023.01) |
| *G06V 10/80* | (2022.01) |
| *G06V 20/58* | (2022.01) |

(52) U.S. Cl.
CPC ........ *G01S 5/02528* (2020.05); *G05D 1/0255* (2013.01); *G06F 16/60* (2019.01); *G06F 16/65* (2019.01); *G06F 18/23* (2023.01); *G06V 10/806* (2022.01); *G06V 20/58* (2022.01); *H04R 2499/13* (2013.01)

(58) Field of Classification Search
CPC ......... G05D 1/0255; G05D 2201/0213; G06K 9/6218; H04R 2499/13
See application file for complete search history.

(56) References Cited

U.S. PATENT DOCUMENTS

| | | | | |
|---|---|---|---|---|
| 11,194,330 | B1* | 12/2021 | Martin | G10L 25/30 |
| 11,257,242 | B2* | 2/2022 | Das | G05D 1/0214 |
| 2010/0046704 | A1* | 2/2010 | Song | G01N 23/04 |
| | | | | 378/57 |
| 2014/0108786 | A1* | 4/2014 | Kreft | G06Q 20/3825 |
| | | | | 713/194 |
| 2015/0341890 | A1* | 11/2015 | Corbellini | G01S 5/18 |
| | | | | 455/456.6 |
| 2016/0337059 | A1 | 11/2016 | Nehls et al. | |
| 2017/0195810 | A1 | 7/2017 | Gonzales, Jr. | |
| 2017/0249957 | A1* | 8/2017 | Park | G10L 25/51 |
| 2019/0122670 | A1* | 4/2019 | Roberts | G10L 17/22 |
| 2020/0395036 | A1* | 12/2020 | Kameoka | G06F 18/23 |

OTHER PUBLICATIONS

[No Author Listed] "SAE International: Surface Vehicle Recommended Practice," J3016, Sep. 30, 2016, 30 pages.

* cited by examiner

2000

```
┌─────────────────────────────────────────────────────────────────────┐
│ Extract, using one or more processors of a vehicle, a feature vector │
│ from acoustic waves received using one or more acoustic sensors of   │
│ the vehicle                                                          │
│ 2004                                                                 │
└─────────────────────────────────────────────────────────────────────┘
                                   │
                                   ▼
┌─────────────────────────────────────────────────────────────────────┐
│ Transmit, using the one or more processors, the feature vector to a │
│ machine learning module of the vehicle, wherein the machine learning │
│ module is trained to receive one or more features and generate a    │
│ score indicative of a probability that the one or more features     │
│ indicate an emergency                                                │
│ 2008                                                                 │
└─────────────────────────────────────────────────────────────────────┘
                                   │
                                   ▼
┌─────────────────────────────────────────────────────────────────────┐
│ Responsive to the score being greater than a threshold value,       │
│ identify, using the machine learning module, a type of the emergency │
│ based on the feature vector                                         │
│ 2012                                                                 │
└─────────────────────────────────────────────────────────────────────┘
                                   │
                                   ▼
┌─────────────────────────────────────────────────────────────────────┐
│ Retrieve, using the one or more processors, an operation for the    │
│ vehicle based on the type of the emergency                          │
│ 2016                                                                 │
└─────────────────────────────────────────────────────────────────────┘
                                   │
                                   ▼
┌─────────────────────────────────────────────────────────────────────┐
│ Operate, using a control circuit of the vehicle, the vehicle in     │
│ accordance with the operation                                       │
│ 2020                                                                 │
└─────────────────────────────────────────────────────────────────────┘
```

FIG. 20 though in the invention relates to driving operations performed by a computing system employed in the operation of the vehicle. The description may also discuss the operation of cabin features and occupants interacting with the vehicle.

AUTONOMOUS VEHICLE OPERATION USING ACOUSTIC MODALITIES

CROSS-REFERENCE TO RELATED APPLICATION

This application claims the benefit of U.S. Provisional Application 62/853,345, filed on May 28, 2019, which is incorporated herein by reference in its entirety

FIELD OF THE INVENTION

This description relates generally to operation of vehicles using sensor data.

BACKGROUND

Operation of a vehicle from an initial location to a final destination often requires a user or the vehicle's decision-making system to select a route through a road network from the initial location to a final destination. Selecting a complex route can require many decisions, making traditional algorithms for route selection impractical. Moreover, traditional sensors of the vehicle used to gather sensor data can sometimes be blocked or can malfunction rendering route navigation difficult. In addition, the presence of parked vehicles, construction zones, and pedestrians complicate route selection and operation.

SUMMARY

Techniques are provided for autonomous vehicle operation using acoustic modalities. The techniques include using one or more acoustic sensors of a vehicle to receive acoustic waves from one or more objects. The acoustic waves have multiple wavelengths. One or more processors of the vehicle are used to cluster the acoustic waves into one or more acoustic clusters based on the multiple wavelengths. The one or more processors are used to select a particular acoustic cluster of the one or more acoustic clusters based on signal processing of the one or more acoustic clusters. The one or more processors are used to associate a particular object of the one or more objects with the particular acoustic cluster. The one or more processors are used to generate an acoustic fingerprint of the particular object based on the particular acoustic cluster. The one or more processors are used to determine characteristics of the particular object based on the acoustic fingerprint of the particular object. A control circuit of the vehicle is used to operate the vehicle to avoid a collision with the particular object based on the characteristics of the particular object.

In an embodiment, one or more processors of a vehicle generate a graphical representation of an operating environment in which the vehicle is located. One or more acoustic sensors of the vehicle are used to receive acoustic waves from an object in the operating environment. The object is occluded from one or more electromagnetic radiation sensors of the vehicle. The one or more processors are used to determine characteristics of the object based on the acoustic waves. The one or more processors are used to determine a spatiotemporal location of the object based on the acoustic waves. The one or more processors are used to generate an updated graphical representation of the operating environment based on the characteristics of the object and the spatiotemporal location of the object. A control circuit of the vehicle operates the vehicle to avoid a collision with the object based on the updated graphical representation.

In an embodiment, one or more processors of a vehicle are used to extract a feature vector from acoustic waves received using one or more acoustic sensors of the vehicle. The one or more processors are used to transmit the feature vector to a machine learning module of the vehicle. The machine learning module is trained to receive one or more features and generate a score indicative of a probability that the one or more features indicate an emergency. Responsive to the score being greater than a threshold value, the machine learning module is used to identify a type of the emergency based on the feature vector. The one or more processors are used to retrieve an operation for the vehicle based on the type of the emergency. A control circuit of the vehicle is used to operate the vehicle in accordance with the operation.

These and other aspects, features, and implementations can be expressed as methods, apparatus, systems, components, program products, means or steps for performing a function, and in other ways.

These and other aspects, features, and implementations will become apparent from the following descriptions, including the claims.

BRIEF DESCRIPTION OF THE DRAWINGS

FIGS. 18-20 show processes for autonomous vehicle operation using acoustic modalities, in accordance with one or more embodiments.

DETAILED DESCRIPTION

Figure 1:
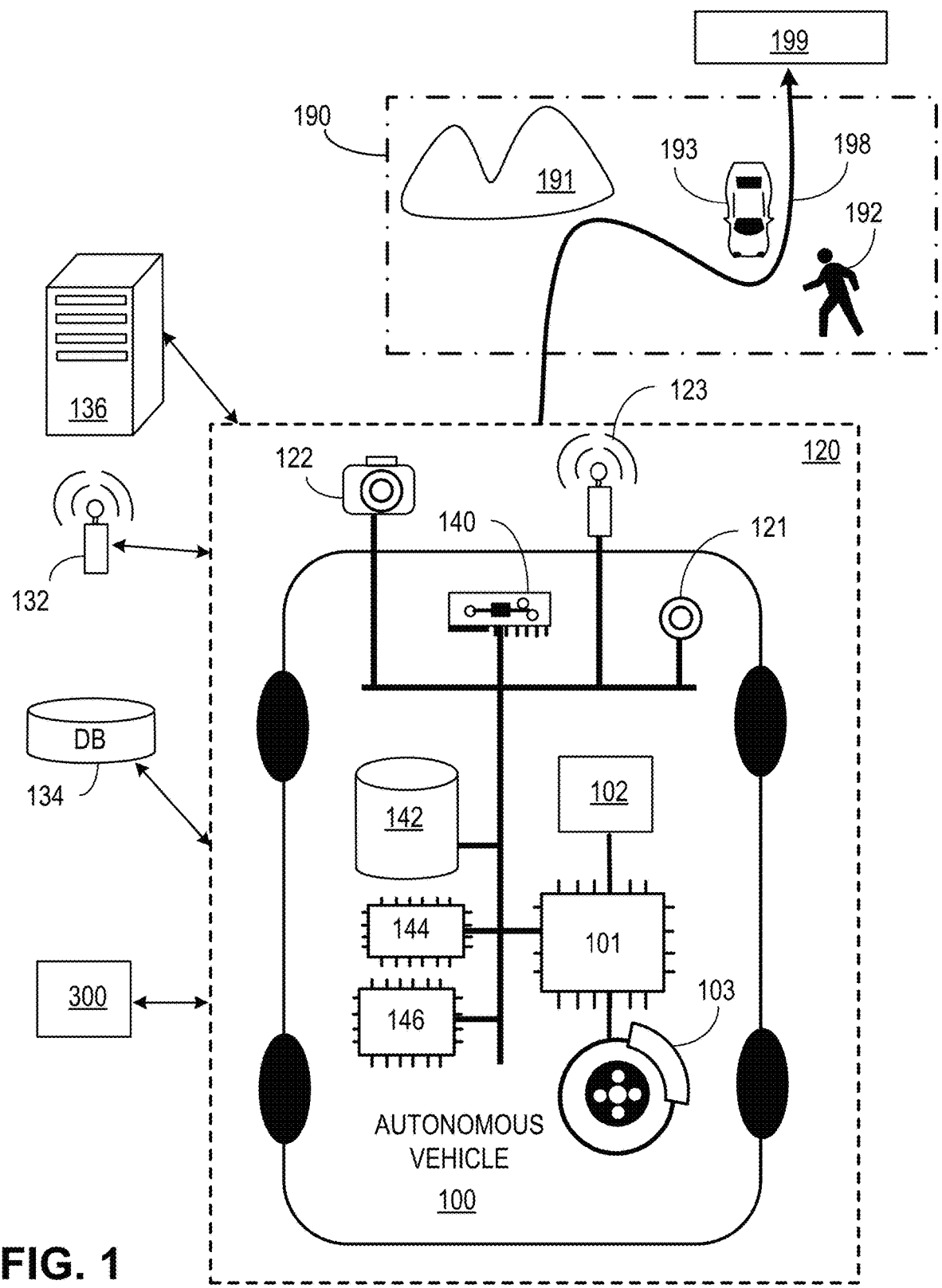
FIG. 1 shows an example of an autonomous vehicle (AV) having autonomous capability, in accordance with one or more embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements In an embodiment.

Further, in the drawings, where connecting elements, such as solid or dashed lines or arrows, are used to show a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are shown in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. System Overview
3. Autonomous Vehicle Architecture
4. Autonomous Vehicle Inputs
5. Autonomous Vehicle Planning
6. Autonomous Vehicle Control
7. Operating Environment for AV Operation Using Acoustic Modalities
8. Machine Learning Framework for AV Operation Using Acoustic Modalities
9. Examples of AV Operation Using Acoustic Modalities
10. Processes for AV Operation Using Acoustic Modalities General Overview An autonomous vehicle (AV) uses sensors to navigate in an operating environment. For example, the sensors include acoustic sensors, visual sensors, electromagnetic radiation sensors, and other kinds of sensors. An AV uses its acoustic sensors to receive acoustic waves from buildings, pedestrians, vehicles, or other objects in the operating environment and generate an acoustic fingerprint from the acoustic waves. The acoustic waves have multiple wavelengths. In order to process the acoustic waves into information useful to the AV, the AV clusters the acoustic waves into one or more acoustic clusters based on the multiple wavelengths. Each acoustic cluster represents a particular object in the operating environment. The AV then uses a gradient filter to seek areas of rapid change in the acoustic waves to identify the particular object. For example, the AV uses a spectrogram or a time-frequency graph to segregate the acoustic waves into segments over time for object recognition. The AV selects a particular acoustic cluster using signal processing based on a size of the acoustic cluster or the wavelengths that are grouped together. The AV then associates a particular object with the particular acoustic cluster.

The AV generates an acoustic fingerprint of the particular object based on the particular acoustic cluster. For example, the AV uses a zero crossing rate, an average spectrum, a spectral flatness, prominent tones across a set of frequency bands, or bandwidth tracking to generate the acoustic fingerprint. The acoustic fingerprint is used to identify and track the particular object. The AV then determines characteristics of the particular object based on the acoustic fingerprint of the object. For example, the AV uses machine learning based on the acoustic fingerprint, or the acoustic fingerprint is compared to a database of stored acoustic fingerprints in order to determine a size, or a make or a model of a vehicle, or identify that a pedestrian is approaching the AV. The AV uses a control circuit to operate the AV to avoid a collision with the particular object based on the characteristics of the particular object. Thus, the acoustic waves are transformed into physical operations by the AV to reduce the probability of collision, improve maneuvering, reduce fuel consumption, and reduce the driving time.

Among others, the benefits and advantages of the embodiments disclosed herein include the conversion of acoustic waves measured by acoustic sensors into physical operations by an autonomous vehicle (AV). The physical operations reduce collisions and improve maneuvering of the AV. The embodiments provide AV operation having reduced fuel consumption and a reduction in driving time. Acoustic fingerprints generated from an operating environment are used to identify and track objects in the operating environment when electromagnetic radiation sensors of the AV are occluded, thus increasing safety. The acoustic waves are used to determine the presence of another vehicle or a pedestrian in a blind spot of the AV or behind an occluded area in the operating environment to determine a trajectory for avoiding a collision with the other vehicle or pedestrian. Safety of the AV and the other objects in the operating environment are improved. The AV can further emit ultrasound signals to bounce off objects in the operating environment and increase the confidence level in object detection and environment segmentation. The use of acoustic sensors increases the confidence level in detecting objects by visual sensors when the visual sensors have noisy measurements or visual object recognition fails. The use of acoustic sensors to detect emergency situations enables the AV to respond to the emergency, transmit a message to a remote server or to an emergency command center, or offer assistance to an emergency vehicle.

System Overview

FIG. 1 shows an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to operate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle and may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings or having two lanes between the lane markings. A lane could also be interpreted in the absence of lane markings. For example, a lane may be defined based on physical features of an environment, e.g., rocks and trees along a thoroughfare in a rural area.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "includes," and/or "including," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 300 described below with respect to FIG. 3.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear velocity and acceleration, angular velocity and acceleration, and heading (e.g., an orientation of the leading end of AV 100). Example of sensors 121 are GNSS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, In an embodiment, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In an embodiment, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

Example Cloud Computing Environment

Figure 2:
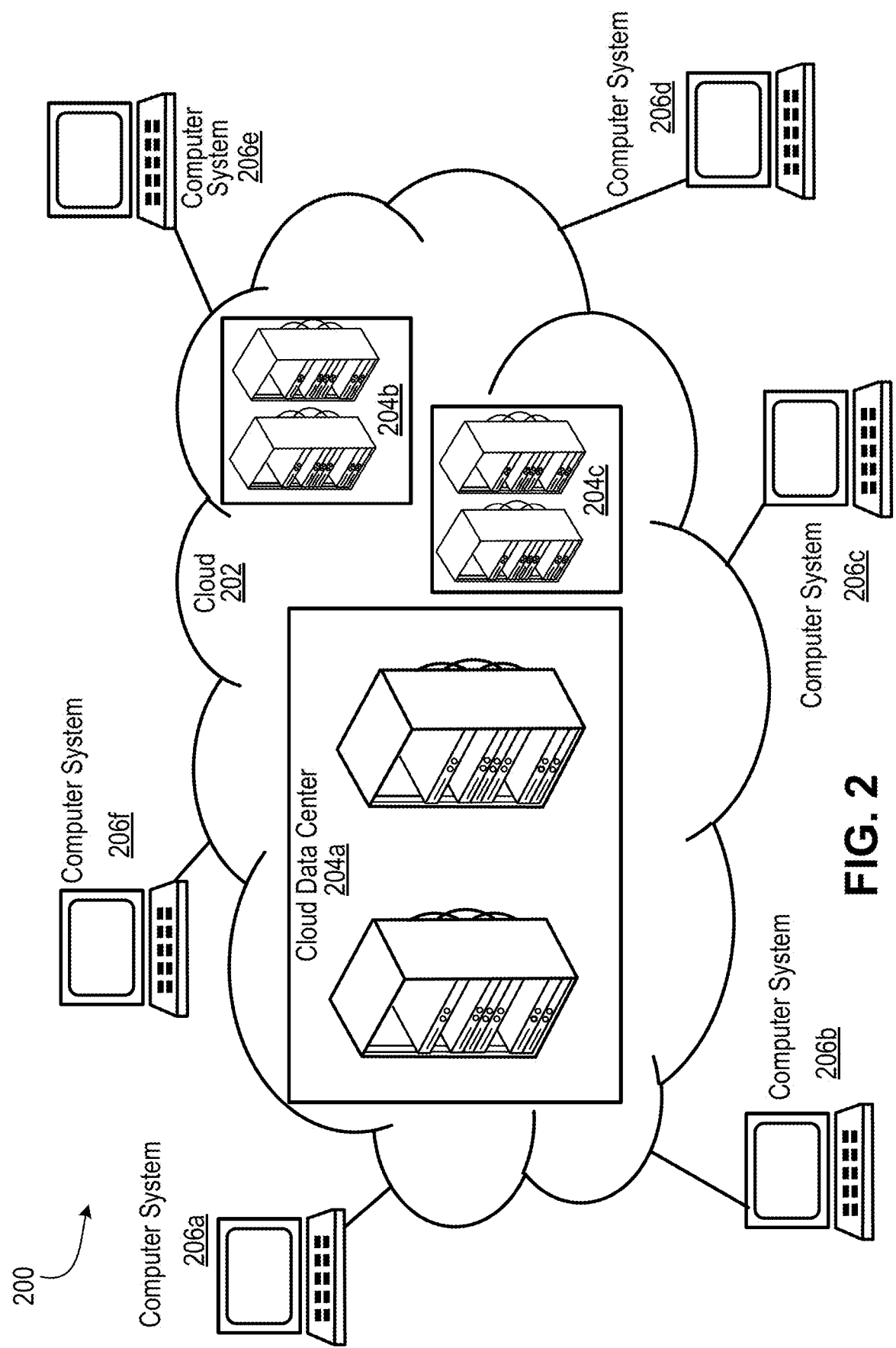
FIG. 2 shows an example "cloud" computing environment, in accordance with one or more embodiments.

FIG. 2 shows an example "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In an embodiment, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206a-f are implemented in or as a part of other systems.

Computer System

Figure 3:
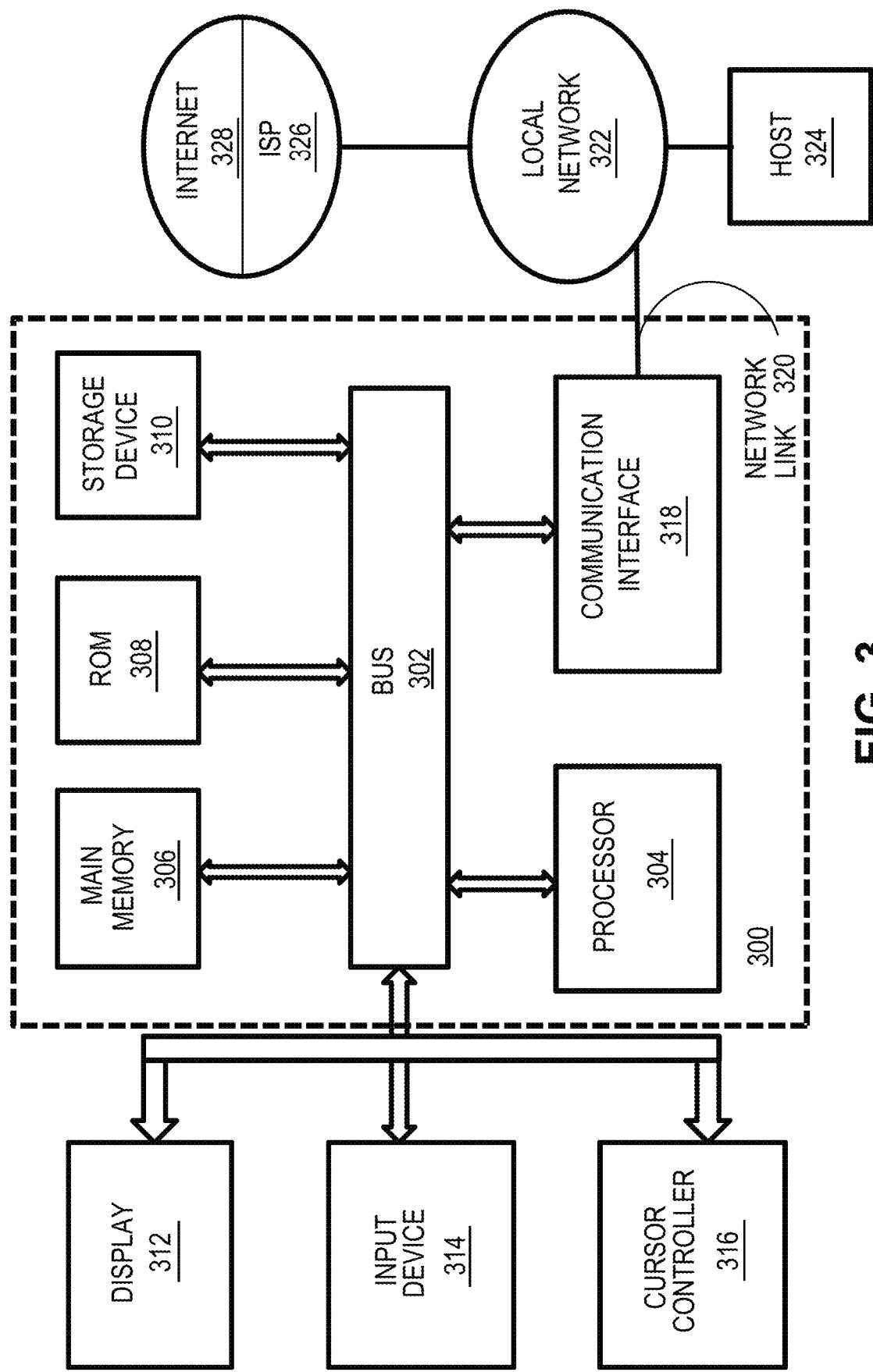
FIG. 3 shows a computer system, in accordance with one or more embodiments.

FIG. 3 shows a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that include the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic, or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
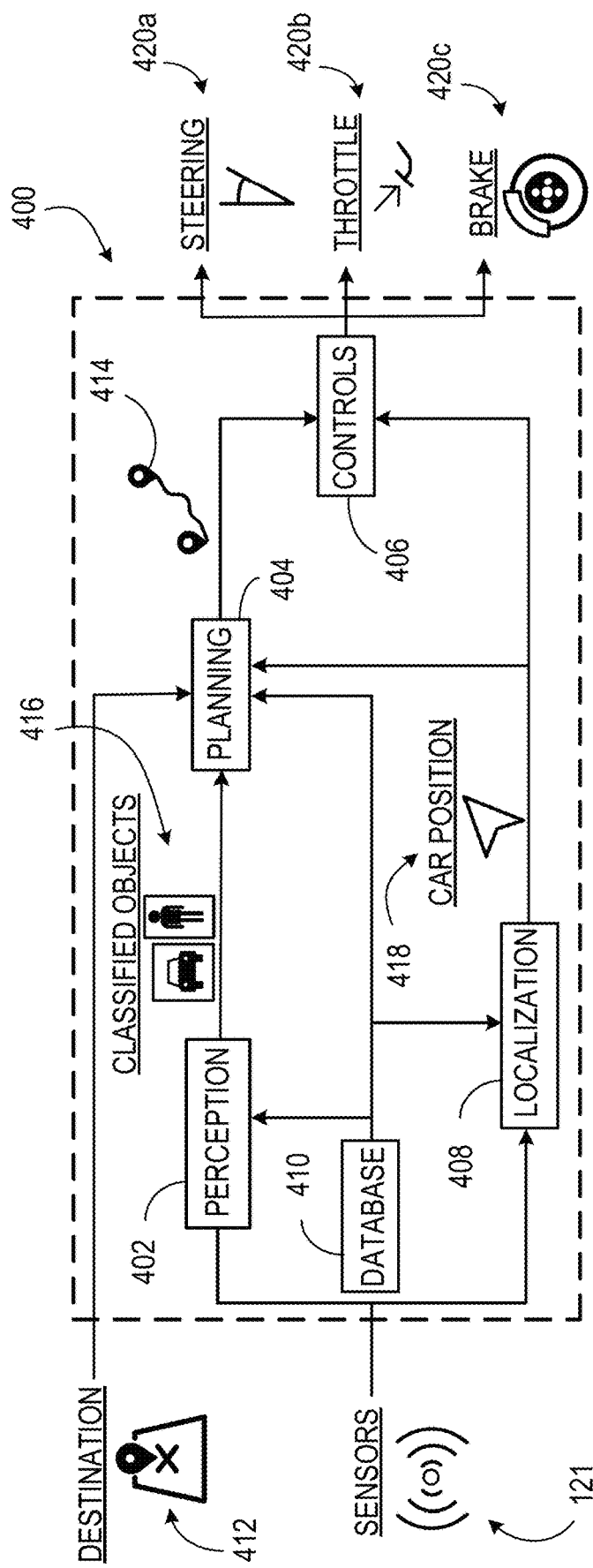
FIG. 4 shows an example architecture for an AV, in accordance with one or more embodiments.

FIG. 4 shows an example architecture 400 for an autonomous vehicle (e.g., the AV 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 shown in FIG. 1. In an embodiment, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things).

In use, the planning module 404 receives data representing a destination 412 and determines data representing a trajectory 414 (sometimes referred to as a route) that is traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Operation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types.

The control module 406 receives the data representing the trajectory 414 and the data representing the AV position 418 and operates the control functions 420a-c (e.g., steering, throttling, braking, ignition) of the AV in a manner that will cause the AV 100 to travel the trajectory 414 to the destination 412. For example, if the trajectory 414 includes a left turn, the control module 406 will operate the control functions 420a-c in a manner such that the steering angle of the steering function will cause the AV 100 to turn left and the throttling and braking will cause the AV 100 to pause and wait for passing pedestrians or vehicles before the turn is made.

Autonomous Vehicle Inputs

Figure 5:
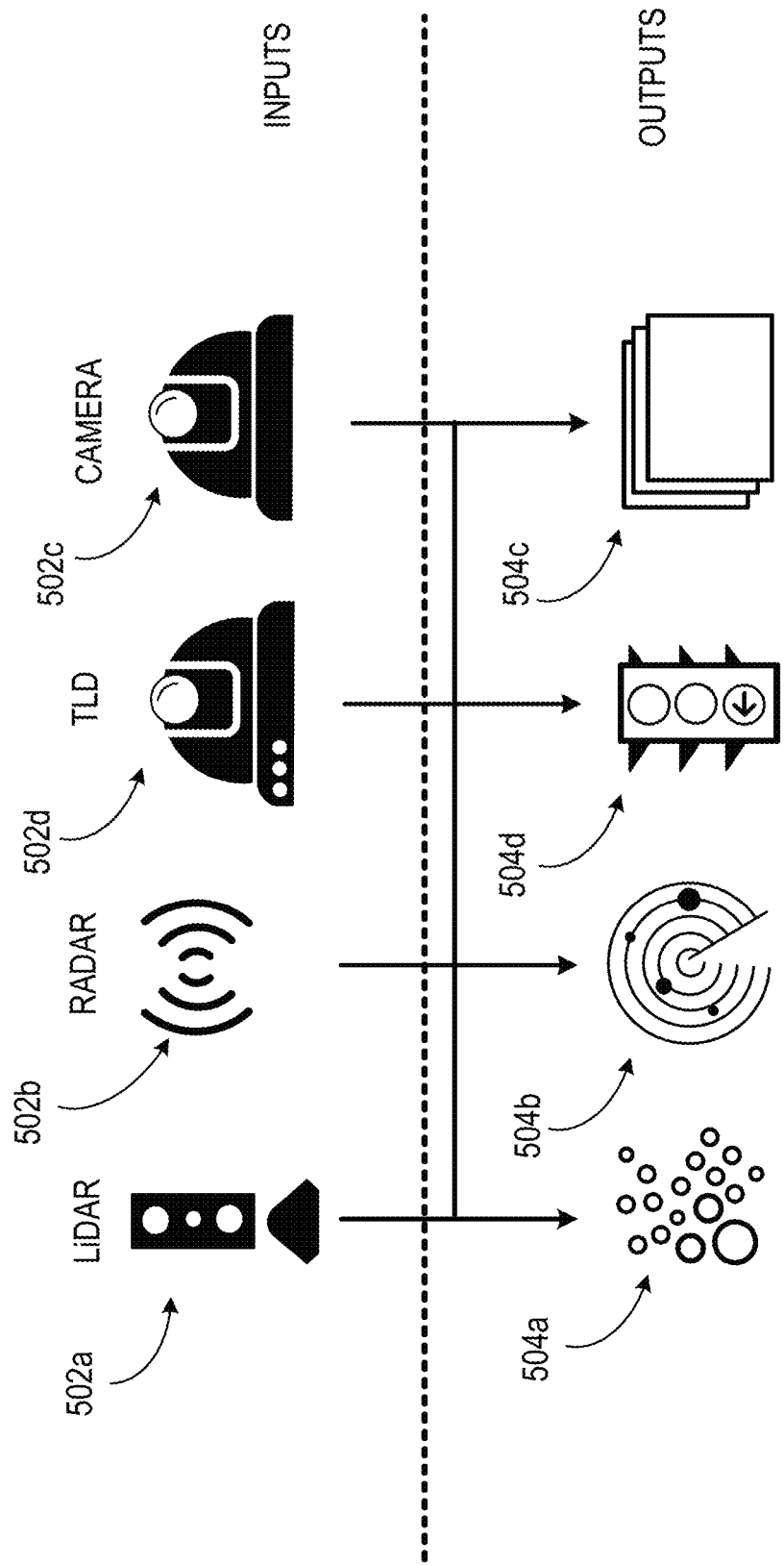
FIG. 5 shows an example of inputs and outputs that may be used by a perception module, in accordance with one or more embodiments.

FIG. 5 shows an example of inputs 502a-d (e.g., sensors 121 shown in FIG. 1) and outputs 504a-d (e.g., sensor data) that is used by the perception module 402 (FIG. 4). One input 502a is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504a. For example, LiDAR data is collections of 3D or 2D points (also known as a point clouds) that are used to construct a representation of the environment 190.

Another input 502b is a RADAR system. RADAR is a technology that uses radio waves to obtain data about nearby physical objects. RADARs can obtain data about objects not within the line of sight of a LiDAR system. A RADAR system 502b produces RADAR data as output 504b. For example, RADAR data are one or more radio frequency electromagnetic signals that are used to construct a representation of the environment 190.

Another input 502c is a camera system. A camera system uses one or more cameras (e.g., digital cameras using a light sensor such as a charge-coupled device [CCD]) to obtain information about nearby physical objects. A camera system produces camera data as output 504c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In use, the camera system may be configured to "see" objects far, e.g., up to a kilometer or more ahead of the AV. Accordingly, the camera system may have features such as sensors and lenses that are optimized for perceiving objects that are far away.

Another input 502d is a traffic light detection (TLD) system. A TLD system uses one or more cameras to obtain information about traffic lights, street signs, and other physical objects that provide visual operation information. A TLD system produces TLD data as output 504d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual operation information as possible, so that the AV 100 has access to all relevant operation information provided by these objects. For example, the viewing angle of the TLD system may be about 120 degrees or more.

In an embodiment, outputs 504a-d are combined using a sensor fusion technique. Thus, either the individual outputs 504a-d are provided to other systems of the AV 100 (e.g., provided to a planning module 404 as shown in FIG. 4), or the combined output is provided to the other systems, either in the form of a single combined output or multiple combined outputs of the same type (e.g., using the same combination technique or combining the same outputs or both) or different types type (e.g., using different respective combination techniques or combining different respective outputs or both). In an embodiment, an early fusion technique is used. An early fusion technique is characterized by combining outputs before one or more data processing steps are applied to the combined output. In an embodiment, a late fusion technique is used. A late fusion technique is characterized by combining outputs after one or more data processing steps are applied to the individual outputs.

Figure 6:
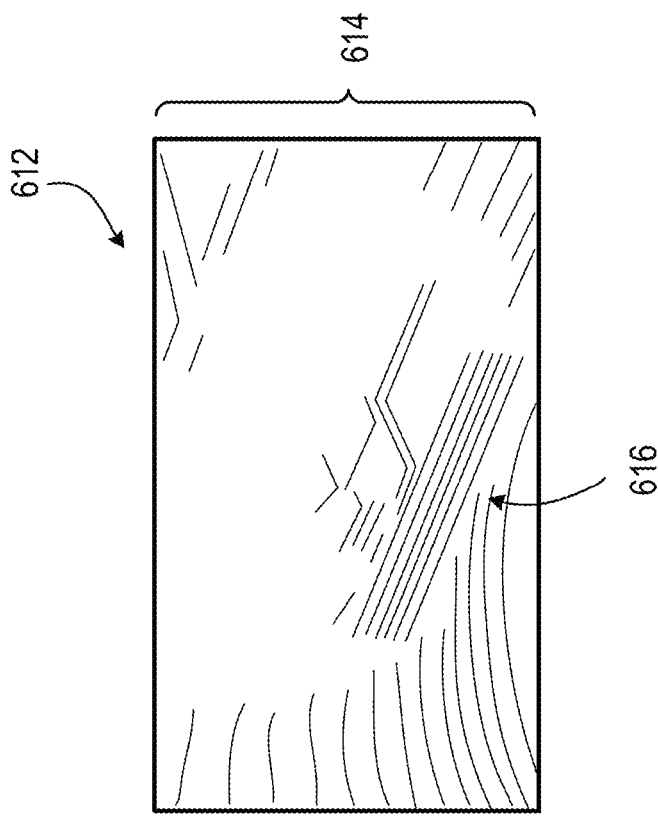
FIG. 6 shows an example of a LiDAR system, in accordance with one or more embodiments.
Figure 6:
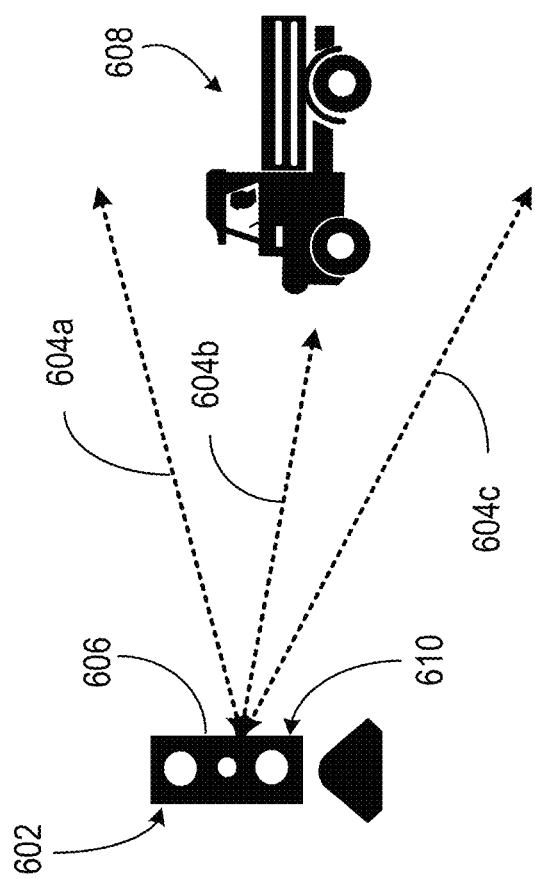

FIG. 6 shows an example of a LiDAR system 602 (e.g., the input 502a shown in FIG. 5). The LiDAR system 602 emits light 604a-c from a light emitter 606 (e.g., a laser transmitter). Light emitted by a LiDAR system is typically not in the visible spectrum; for example, infrared light is often used. Some of the light 604b emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 7:
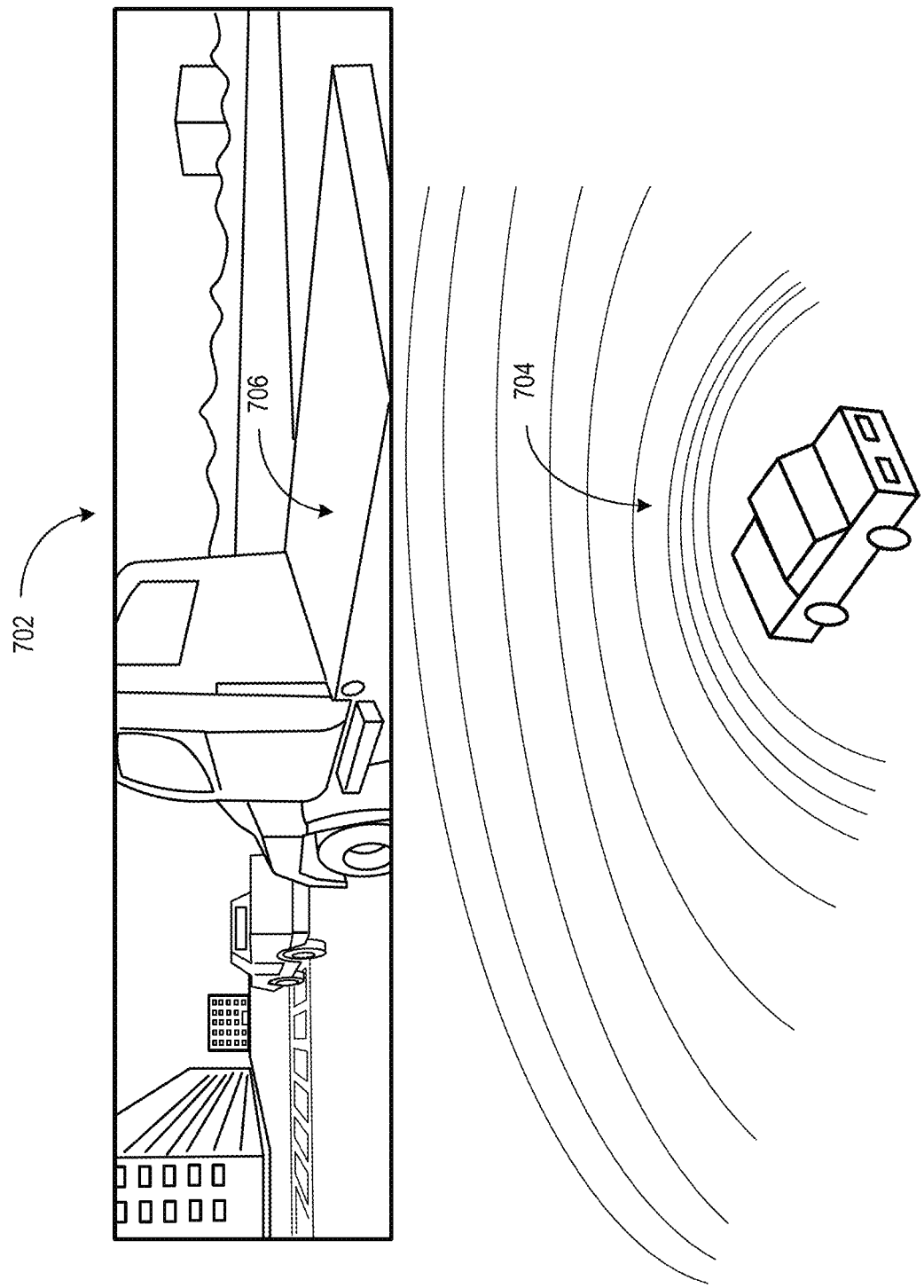
FIG. 7 shows the LiDAR system in operation, in accordance with one or more embodiments.

FIG. 7 shows the LiDAR system 602 in operation. In the scenario shown in this figure, the AV 100 receives both camera system output 504c in the form of an image 702 and LiDAR system output 504a in the form of LiDAR data points 704. In use, the data processing systems of the AV 100 compares the image 702 to the data points 704. In particular, a physical object 706 identified in the image 702 is also identified among the data points 704. In this way, the AV 100 perceives the boundaries of the physical object based on the contour and density of the data points 704.

Figure 8:
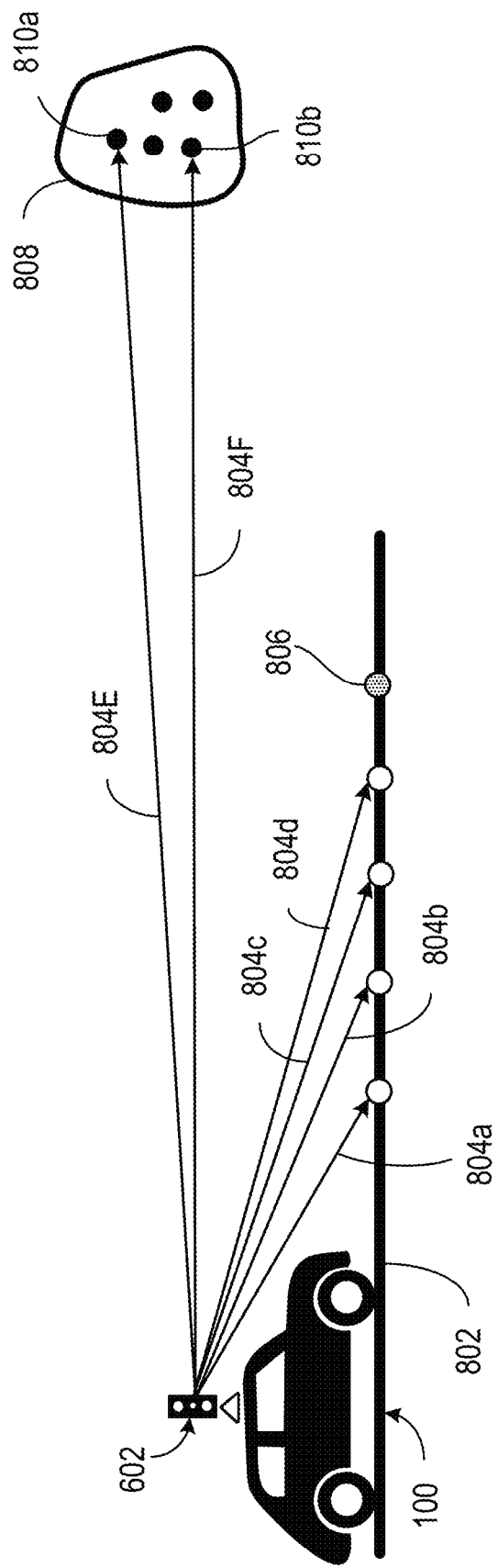
FIG. 8 shows the operation of the LiDAR system in additional detail, in accordance with one or more embodiments.

FIG. 8 shows the operation of the LiDAR system 602 in additional detail. As described above, the AV 100 detects the boundary of a physical object based on characteristics of the data points detected by the LiDAR system 602. As shown in FIG. 8, a flat object, such as the ground 802, will reflect light 804a-d emitted from a LiDAR system 602 in a consistent manner. Put another way, because the LiDAR system 602 emits light using consistent spacing, the ground 802 will reflect light back to the LiDAR system 602 with the same consistent spacing. As the AV 100 travels over the ground 802, the LiDAR system 602 will continue to detect light reflected by the next valid ground point 806 if nothing is obstructing the road. However, if an object 808 obstructs the road, light 804e-f emitted by the LiDAR system 602 will be reflected from points 810a-b in a manner inconsistent with the expected consistent manner. From this information, the AV 100 can determine that the object 808 is present.

Path Planning

Figure 9:
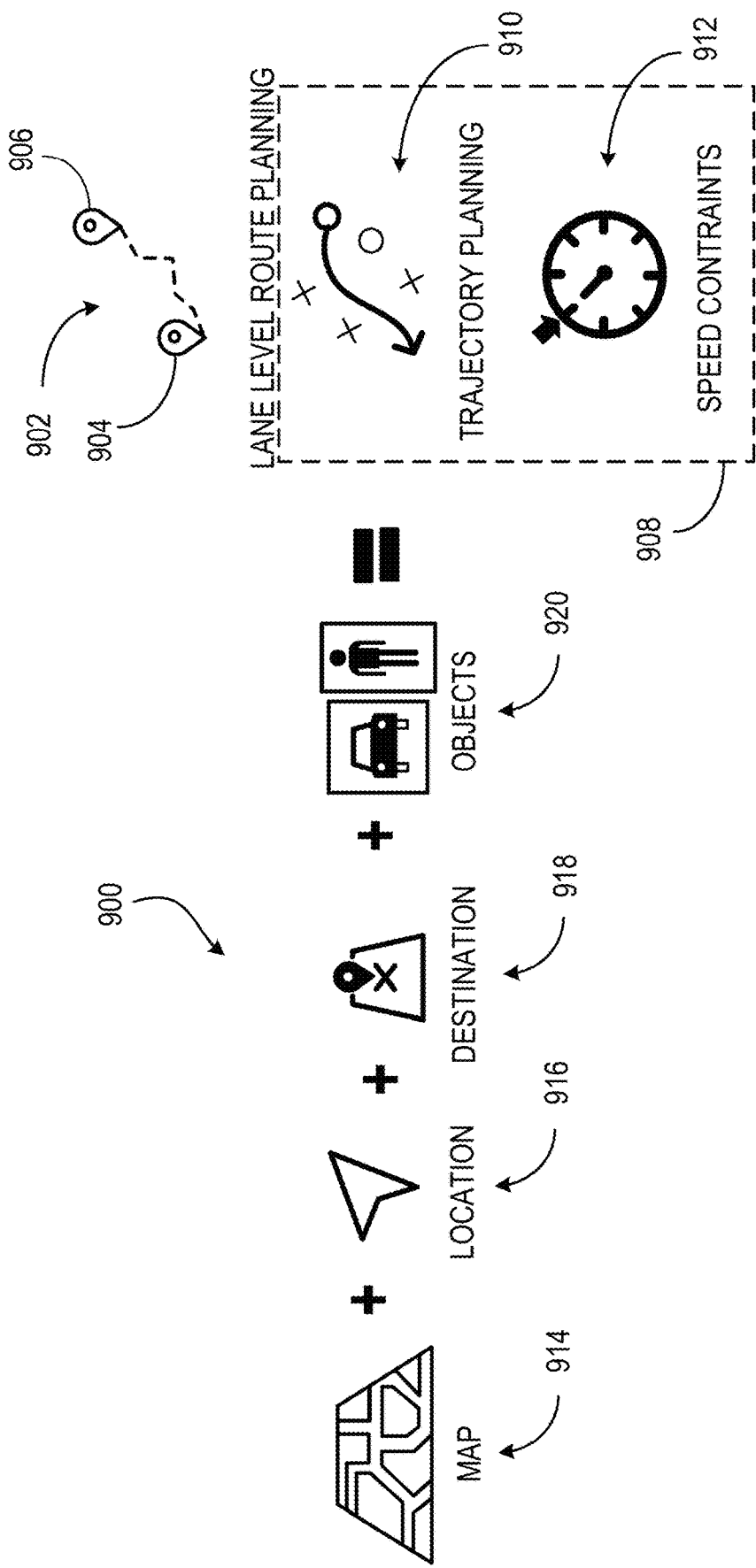
FIG. 9 shows a block diagram of the relationships between inputs and outputs of a planning module, in accordance with one or more embodiments.

FIG. 9 shows a block diagram 900 of the relationships between inputs and outputs of a planning module 404 (e.g., as shown in FIG. 4). In general, the output of a planning module 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the AV 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning module also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the AV 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 908 includes speed constraints 912 specific to a segment of the route 902. For example, if the segment includes pedestrians or unexpected traffic, the speed constraints 912 may limit the AV 100 to a travel speed slower than an expected speed, e.g., a speed based on speed limit data for the segment.

In an embodiment, the inputs to the planning module 404 includes database data 914 (e.g., from the database module 410 shown in FIG. 4), current location data 916 (e.g., the AV position 418 shown in FIG. 4), destination data 918 (e.g., for the destination 412 shown in FIG. 4), and object data 920 (e.g., the classified objects 416 as perceived by the perception module 402 as shown in FIG. 4). In an embodiment, the database data 914 includes rules used in planning. Rules are specified using a formal language, e.g., using Boolean logic. In any given situation encountered by the AV 100, at least some of the rules will apply to the situation. A rule applies to a given situation if the rule has conditions that are met based on information available to the AV 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 10:
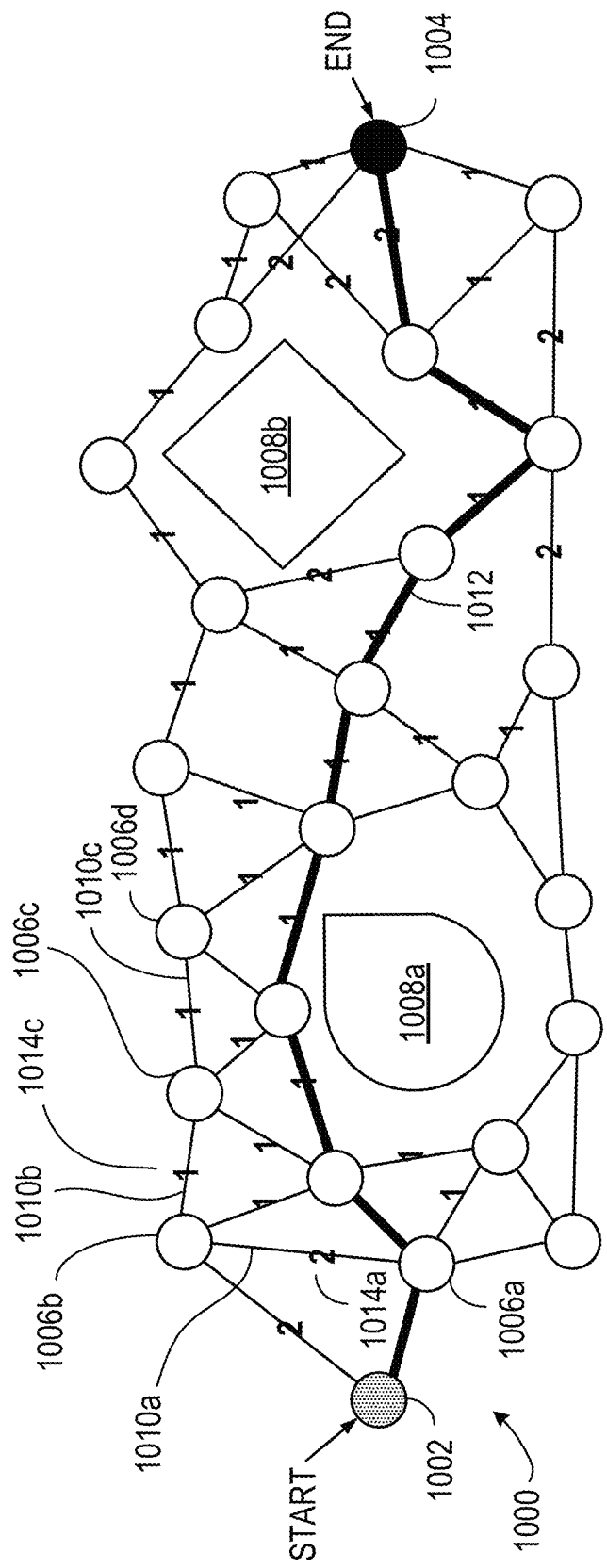
FIG. 10 shows a directed graph used in path planning, in accordance with one or more embodiments.

FIG. 10 shows a directed graph 1000 used in path planning, e.g., by the planning module 404 (FIG. 4). In general, a directed graph 1000 like the one shown in FIG. 10 is used to determine a path between any start point 1002 and end point 1004. In real-world terms, the distance separating the start point 1002 and end point 1004 may be relatively large (e.g., in two different metropolitan areas) or may be relatively small (e.g., two intersections abutting a city block or two lanes of a multi-lane road).

In an embodiment, the directed graph 1000 has nodes 1006a-d representing different locations between the start point 1002 and the end point 1004 that could be occupied by an AV 100. In some examples, e.g., when the start point 1002 and end point 1004 represent different metropolitan areas, the nodes 1006a-d represent segments of roads. In some examples, e.g., when the start point 1002 and the end point 1004 represent different locations on the same road, the nodes 1006a-d represent different positions on that road. In this way, the directed graph 1000 includes information at varying levels of granularity. In an embodiment, a directed graph having high granularity is also a subgraph of another directed graph having a larger scale. For example, a directed graph in which the start point 1002 and the end point 1004 are far away (e.g., many miles apart) has most of its information at a low granularity and is based on stored data, but also includes some high granularity information for the portion of the graph that represents physical locations in the field of view of the AV 100.

The nodes 1006a-d are distinct from objects 1008a-b which cannot overlap with a node. In an embodiment, when granularity is low, the objects 1008a-b represent regions that cannot be traversed by automobile, e.g., areas that have no streets or roads. When granularity is high, the objects 1008a-b represent physical objects in the field of view of the AV 100, e.g., other automobiles, pedestrians, or other entities with which the AV 100 cannot share physical space. In an embodiment, some or all of the objects 1008a-b are static objects (e.g., an object that does not change position such as a street lamp or utility pole) or dynamic objects (e.g., an object that is capable of changing position such as a pedestrian or other car).

The nodes 1006a-d are connected by edges 1010a-c. If two nodes 1006a-b are connected by an edge 1010a, it is possible for an AV 100 to travel between one node 1006a and the other node 1006b, e.g., without having to travel to an intermediate node before arriving at the other node 1006b. (When we refer to an AV 100 traveling between nodes, we mean that the AV 100 travels between the two physical positions represented by the respective nodes.) The edges 1010a-c are often bidirectional, in the sense that an AV 100 travels from a first node to a second node, or from the second node to the first node. In an embodiment, edges 1010a-c are unidirectional, in the sense that an AV 100 can travel from a first node to a second node, however the AV 100 cannot travel from the second node to the first node. Edges 1010a-c are unidirectional when they represent, for example, one-way streets, individual lanes of a street, road, or highway, or other features that can only be traversed in one direction due to legal or physical constraints.

In an embodiment, the planning module 404 uses the directed graph 1000 to identify a path 1012 made up of nodes and edges between the start point 1002 and end point 1004.

An edge 1010a-c has an associated cost 1014a-b. The cost 1014a-b is a value that represents the resources that will be expended if the AV 100 chooses that edge. A typical resource is time. For example, if one edge 1010a represents a physical distance that is twice that as another edge 1010b, then the associated cost 1014a of the first edge 1010a may be twice the associated cost 1014b of the second edge 1010b. Other factors that affect time include expected traffic, number of intersections, speed limit, etc. Another typical resource is fuel economy. Two edges 1010a-b may represent the same physical distance, but one edge 1010a may require more fuel than another edge 1010b, e.g., because of road conditions, expected weather, etc.

When the planning module 404 identifies a path 1012 between the start point 1002 and end point 1004, the planning module 404 typically chooses a path optimized for cost, e.g., the path that has the least total cost when the individual costs of the edges are added together.

Autonomous Vehicle Control

Figure 11:
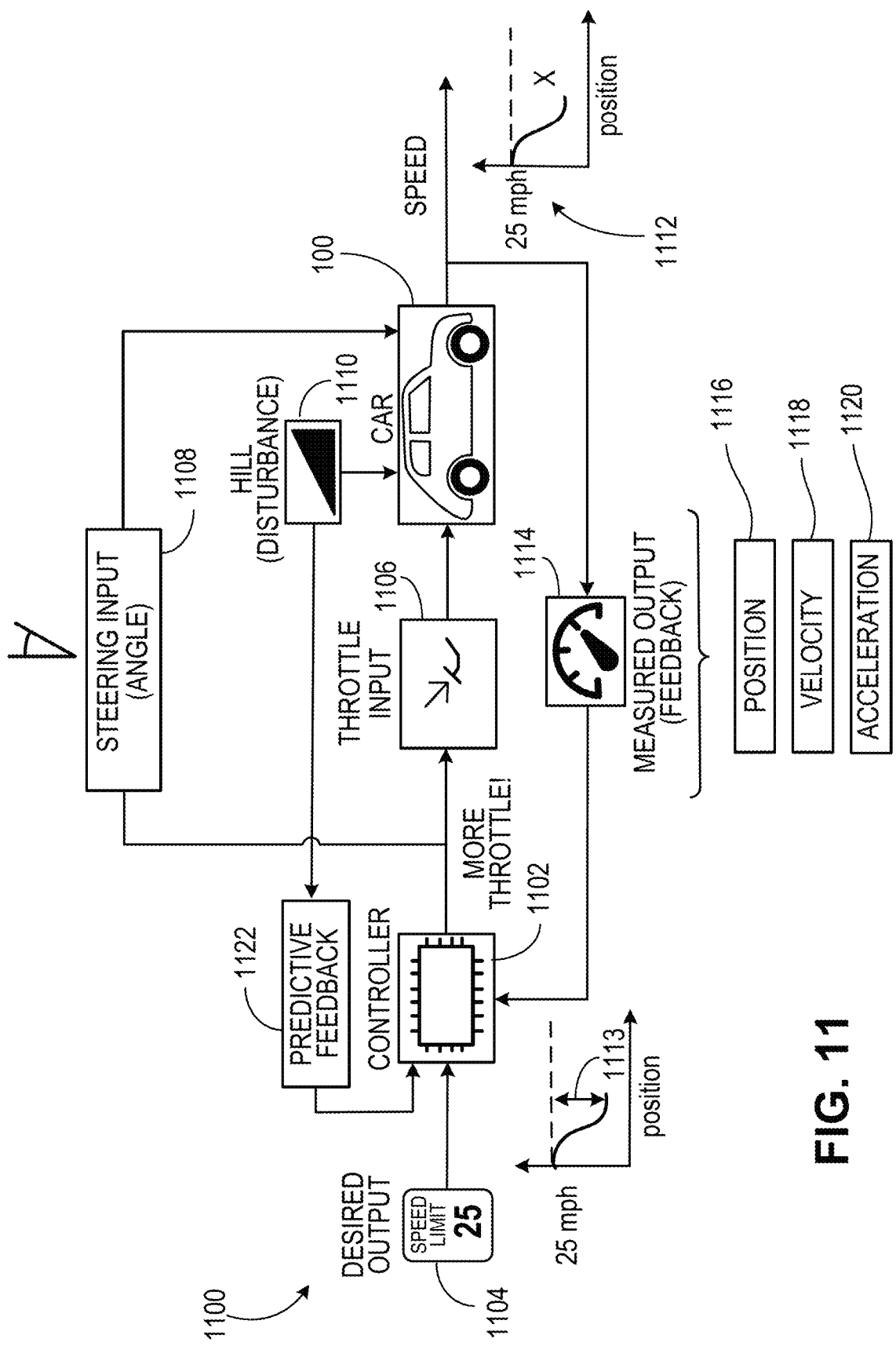
FIG. 11 shows a block diagram of the inputs and outputs of a control module, in accordance with one or more embodiments.

FIG. 11 shows a block diagram 1100 of the inputs and outputs of a control module 406 (e.g., as shown in FIG. 4). A control module operates in accordance with a controller 1102 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 1308, and storage device 210, and instructions stored in memory that carry out operations of the controller 1102 when the instructions are executed (e.g., by the one or more processors).

In an embodiment, the controller 1102 receives data representing a desired output 1104. The desired output 1104 typically includes a velocity, e.g., a speed and a heading. The desired output 1104 is based on, for example, data received from a planning module 404 (e.g., as shown in FIG. 4). In accordance with the desired output 1104, the controller 1102 produces data usable as a throttle input 1106 and a steering input 1108. The throttle input 1106 represents the magnitude in which to engage the throttle (e.g., acceleration control) of an AV 100, e.g., by engaging the steering pedal, or engaging another throttle control, to achieve the desired output 1104. In some examples, the throttle input 1106 also includes data usable to engage the brake (e.g., deceleration control) of the AV 100. The steering input 1108 represents a steering angle, e.g., the angle at which the steering control (e.g., steering wheel, steering angle actuator, or other functionality for controlling steering angle) of the AV should be positioned to achieve the desired output 1104.

In an embodiment, the controller 1102 receives feedback that is used in adjusting the inputs provided to the throttle and steering. For example, if the AV 100 encounters a disturbance 1110, such as a hill, the measured speed 1112 of the AV 100 is lowered below the desired output speed. In an embodiment, any measured output 1114 is provided to the controller 1102 so that the necessary adjustments are performed, e.g., based on the differential 1113 between the measured speed and desired output. The measured output 1114 includes measured position 1116, measured velocity 1118, (including speed and heading), measured acceleration 1120, and other outputs measurable by sensors of the AV 100.

In an embodiment, information about the disturbance 1110 is detected in advance, e.g., by a sensor such as a camera or LiDAR sensor, and provided to a predictive feedback module 1122. The predictive feedback module 1122 then provides information to the controller 1102 that the controller 1102 can use to adjust accordingly. For example, if the sensors of the AV 100 detect ("see") a hill, this information is used by the controller 1102 to prepare to engage the throttle at the appropriate time to avoid significant deceleration.

Figure 12:
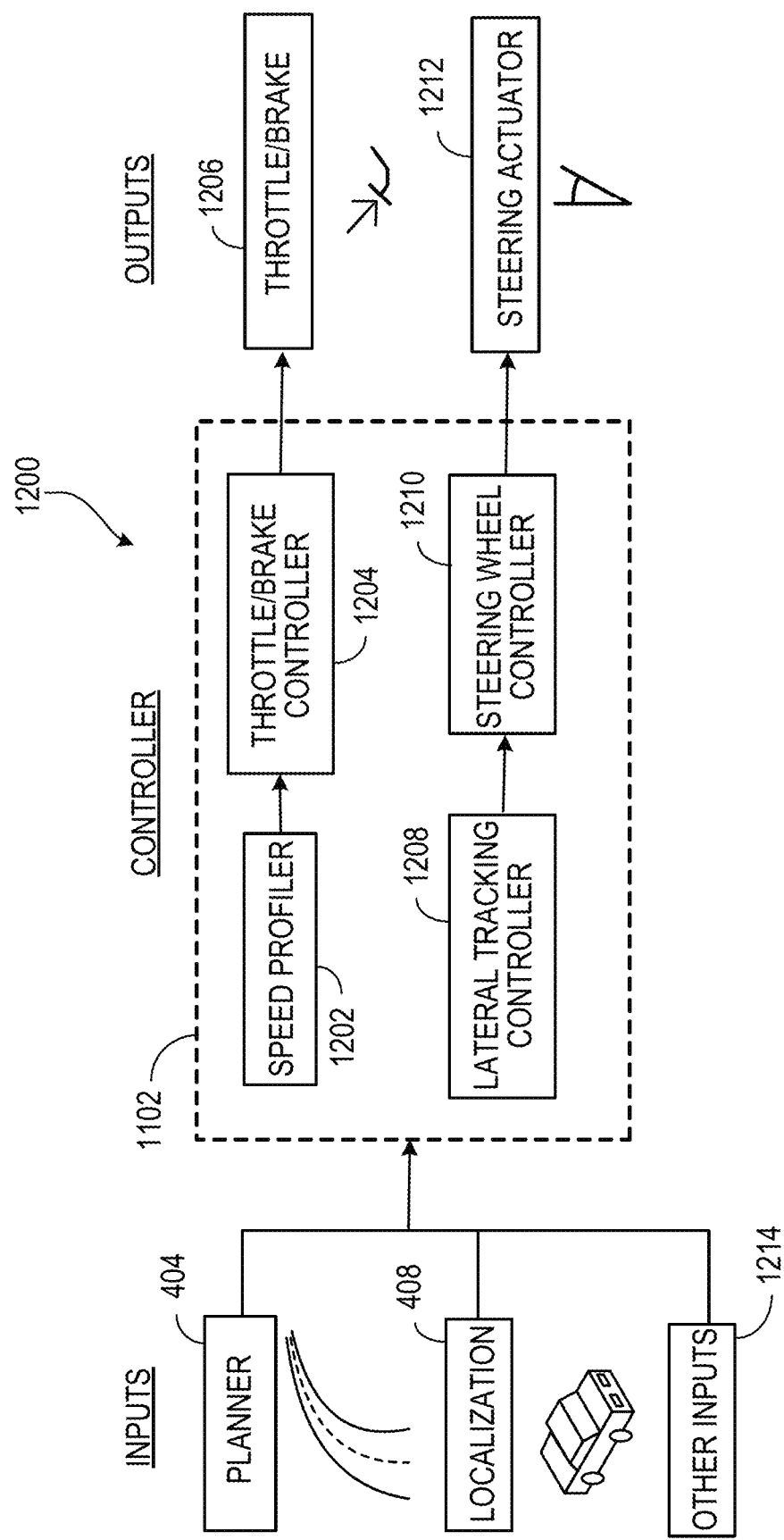
FIG. 12 shows a block diagram of the inputs, outputs, and components of a controller, in accordance with one or more embodiments.

FIG. 12 shows a block diagram 1200 of the inputs, outputs, and components of the controller 1102. The controller 1102 has a speed profiler 1202 which affects the operation of a throttle/brake controller 1204. For example, the speed profiler 1202 instructs the throttle/brake controller 1204 to engage acceleration or engage deceleration using the throttle/brake 1206 depending on, e.g., feedback received by the controller 1102 and processed by the speed profiler 1202.

The controller 1102 also has a lateral tracking controller 1208 which affects the operation of a steering controller 1210. For example, the lateral tracking controller 1208 instructs the steering controller 1204 to adjust the position of the steering angle actuator 1212 depending on, e.g., feedback received by the controller 1102 and processed by the lateral tracking controller 1208.

The controller 1102 receives several inputs used to determine how to control the throttle/brake 1206 and steering angle actuator 1212. A planning module 404 provides information used by the controller 1102, for example, to choose a heading when the AV 100 begins operation and to determine which road segment to traverse when the AV 100 reaches an intersection. A localization module 408 provides information to the controller 1102 describing the current location of the AV 100, for example, so that the controller 1102 can determine if the AV 100 is at a location expected based on the manner in which the throttle/brake 1206 and steering angle actuator 1212 are being controlled. In an embodiment, the controller 1102 receives information from other inputs 1214, e.g., information received from databases, computer networks, etc.

Figure 13:
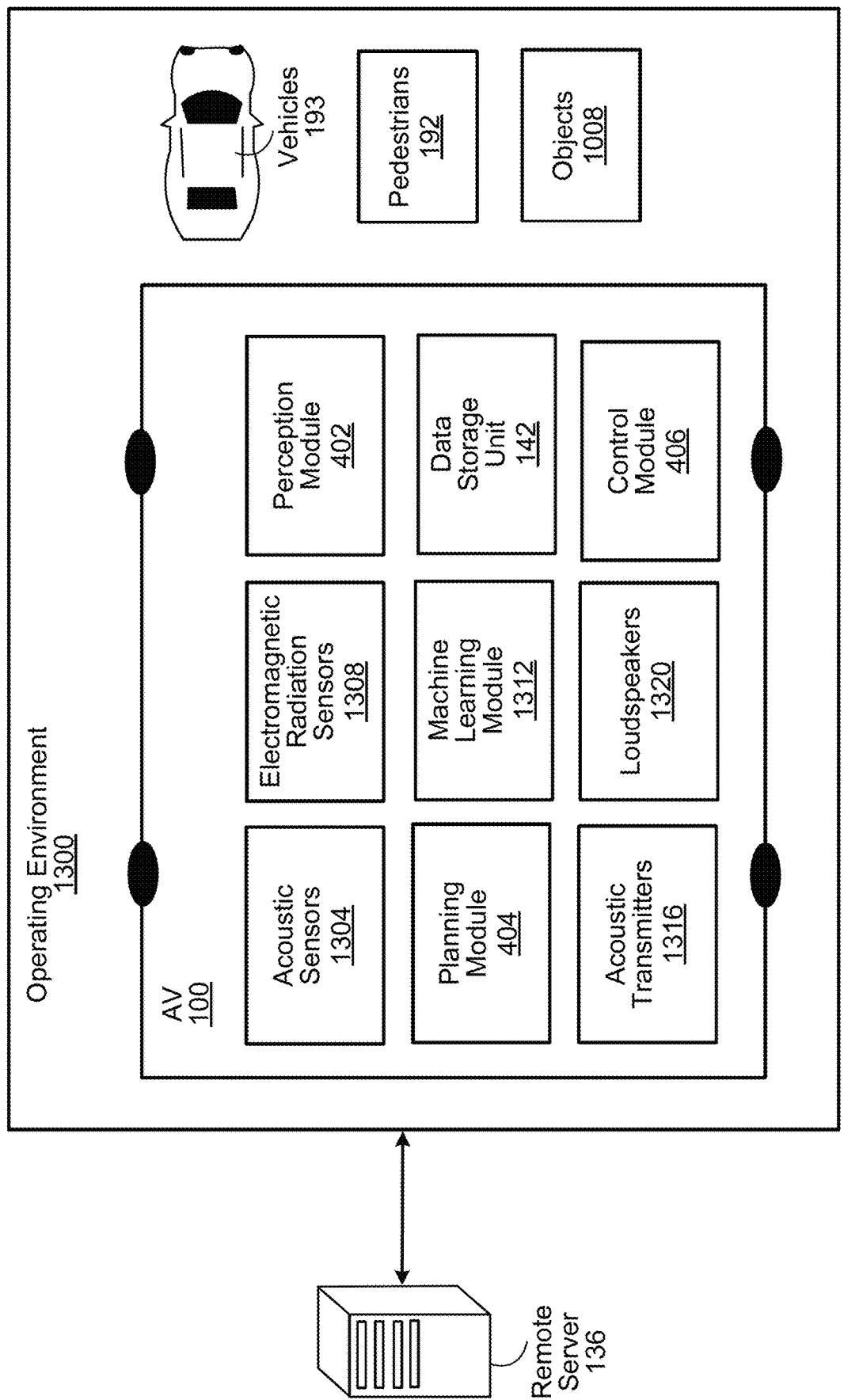
FIG. 13 shows a block diagram of an operating environment for autonomous vehicle operation using acoustic modalities, in accordance with one or more embodiments.

Operating Environment for Autonomous Vehicle Operation Using Acoustic Modalities FIG. 13 shows a block diagram of an operating environment 1300 for autonomous vehicle (AV) operation using acoustic modalities, in accordance with one or more embodiments. The block diagram of FIG. 13 includes a remote server 136 and the operating environment 1300. In other embodiments, the block diagram of FIG. 13 includes additional or fewer objects than those described herein.

The remote server 136 shown in FIG. 13 is, e.g., a teleoperation server or a cloud server as illustrated and described above with reference to FIG. 1. The remote server 136 includes one or more processors and data storage. The remote server 136 communicates with entities in the operating environment 1300, for example, the AV 100, one or more vehicles 193, or one or more objects 1008 over a network. The network represents any combination of one or more local networks, wide area networks, or internetworks coupled using wired or wireless links deployed using terrestrial or satellite connections. Data exchanged over the network is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In an embodiment, the network represents one or more interconnected internetworks, such as the public Internet.

The operating environment 1300 represents a geographical area, such as a state, a town, a neighborhood, or a road network. The operating environment 1300 may be an example of the operating environment 190 illustrated and described above with reference to FIG. 1. The AV 100, one or more other vehicles 193, one or more pedestrians 192, and one or more objects 1008 are located within the operating environment 1300. The objects 1008 are physical entities external to the AV 100 as described above with reference to FIG. 1000.

The one or more vehicles 193 represent, e.g., other AVs, partly autonomous, or non-autonomous vehicles operating in the operating environment 1300. In an embodiment, a vehicle 193 is parked on a street or in a parking lot. The vehicle 193 is illustrated and described above with reference to FIG. 1. For example, the vehicle 193 enters or exits the AV operating environment 1300 during navigation as well as navigates within other environments. The vehicle 193 is part of the traffic experienced on roadways of the AV operating environment 1300 by the AV 1300. In an embodiment, the vehicle 193 belongs to one or more AV fleets.

The one or more pedestrians 192 are persons who are walking or standing on a sidewalk, a crosswalk, a street or some other portion of a drivable area navigable by the AV 100. A pedestrian 192 is illustrated and described above with reference to FIG. 1. In an embodiment, the pedestrian 192 represents a set of objects in the environment that are detected and classified in the AV operating environment 1300. The set includes pedestrians, cyclists or persons riding small form-factor vehicles, such as a skateboards, e-scooters, Segway™, personal light electric vehicle, and personal mobility device.

The one or more objects 1008 are external to the AV 1308 and may be examples of the objects 416 illustrated and described above with reference to FIGS. 4 and 5. The object 1008 is illustrated and described above with reference to FIG. 10. In an embodiment, the object 1008 is a static portion or aspect of the AV operating environment 1300, such as a road segment, a traffic signal a building, a parking space located on a road segment, a highway exit or entrance ramp, multiple lanes of a drivable area of the AV operating environment 1300, an elevation of the drivable area, a curb located adjacent to the drivable area, or a median separating two lanes of the drivable area. In an embodiment, the object 1008 is a dynamic object, such as another vehicle, a pedestrian, or a cyclist. The AV 100 receives sensor data representing characteristics of a particular object of the one or more objects 1008 and performs collision prediction and reduces driving aggressiveness if needed. The objects 1008 are described above in more detail with reference to the physical object 608, boundaries 616 of a physical object 608, the physical object 706, the ground 802, and the object 808 in FIGS. 6, 7, and 8.

The AV 100 is a partly autonomous or fully autonomous vehicle that uses one or more acoustic sensors 1304, one or more electromagnetic radiation sensors 1308, a perception module 402, and a planning module 404 to plan a trajectory to navigate around a particular object. An example of such a trajectory is the trajectory 198 shown in FIG. 1. The AV 100 includes the acoustic sensors 1304, the electromagnetic radiation sensors 1308, the perception module 402, the planning module 404, a machine learning module 1312, a data storage unit 142, one or more acoustic transmitters 1316, one or more loudspeakers 1320, and a control module 406. The AV 100 is described above in more detail with reference to FIG. 1. In other embodiments, the AV 100 includes additional or fewer components than those described herein. Similarly, the functions can be distributed among the components and/or different entities in a different manner than is described here.

The acoustic sensors 1304 of the AV 100 receive acoustic waves from the one or more objects 1008. The acoustic waves are sound waves, e.g., emitted, reflected, or refracted by the one or more objects 1008 transmitted via the air in the operating environment 1300. The acoustic sensors 1304 are transducers that convert the acoustic waves into acoustic sensor data. For example, an acoustic sensor 1304 is a microphone and the acoustic sensor data are electrical signals representing the acoustic waves received by the microphone. For example, the acoustic sensors 1304 use different methods convert the acoustic pressure variations of the acoustic waves to the acoustic sensor data. For example, an acoustic sensor 1304 includes a coil of wire suspended in a magnetic field, a vibrating diaphragm, or a crystal of piezoelectric material.

The data storage unit 142 is illustrated and described above with reference to FIG. 1. The data storage unit 142 is used to store data, for example, acoustic sensor data, electromagnetic radiation sensor data, instructions on routing received from the remote server 136, training data or training sets for the machine learning module 1312, or trajectory data generated by the planning module 404.

The electromagnetic radiation sensors 1308 of the AV 100 include, e.g., visual sensors that sense a state of the operating environment 1300 such as the presence of the vehicles 193, the pedestrians 192, or the objects 1008. The electromagnetic radiation sensors 1308 are communicatively coupled to the perception module 402 to transmit electromagnetic radiation sensor data. For example, the electromagnetic radiation sensors 1308 include one or more monocular or stereo video cameras in the visible light, infrared or thermal (or both) spectra, LiDAR, RADAR, ultrasonic sensors, or time-of-flight (TOF) depth sensors. The electromagnetic radiation sensors 1308 are an example of the sensors 122-123 illustrated and described above with reference to FIG. 1.

In an embodiment, the electromagnetic radiation sensor data includes LiDAR point cloud data or camera images. The LiDAR sensors of the AV 100 are used to illuminate a particular object, for example, the vehicle 193, with pulsed laser light and measure the reflected pulses. For example, differences in laser return times and wavelengths are then used to generate the electromagnetic radiation sensor data and create a digital 3-D representation of a particular object. In an embodiment, the LiDAR point cloud data is stored as a multidimensional occupancy grid. The LiDAR point cloud data is pre-processed at the signal level and then processed at a higher level to extract characteristics of a particular object. In an embodiment, a combination two- and three-dimensional grid structure is used and the space in these structures is tessellated into several discrete cells. The structure of the LiDAR point cloud data allows a large amount of raw measurement data to be handled by the AV 100.

Figure 16:
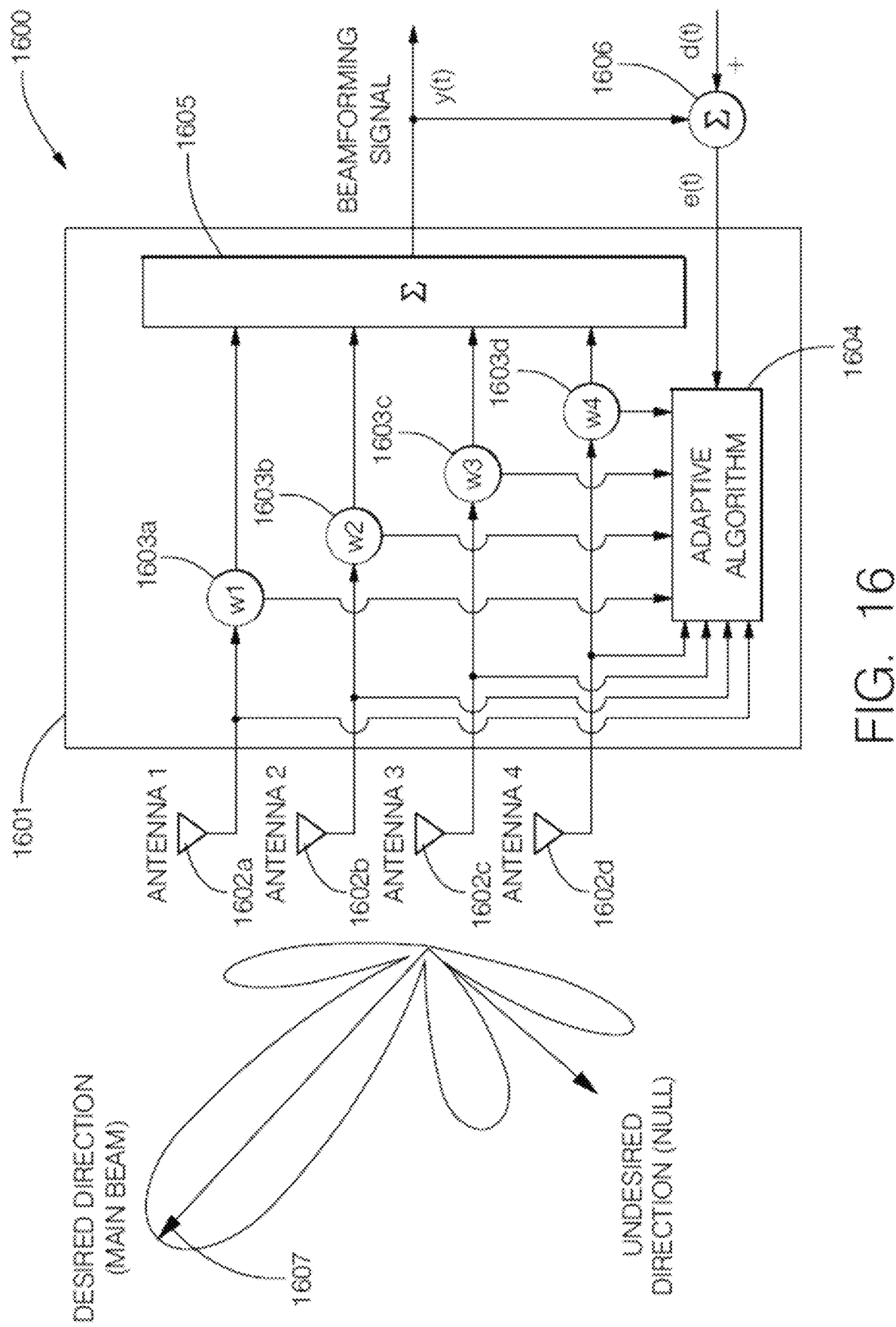
FIG. 16 shows a system for localizing multiple acoustic sources, in accordance with one or more embodiments.

The perception module 402 and planning module 404 are illustrated and described above with reference to FIG. 4. In driving mode, the perception module 402 uses data from the acoustic sensors 1304 and electromagnetic radiation sensors 1308, for example, acoustic sensor data, LiDAR data, or stereo camera data, to detect and classify or label static objects and dynamic objects in the operating environment 1300. The classified/labeled objects and their characteristics, for example, positions, velocities, or headings, are used by the planning module 404 to predict a collision between the AV 100 and a particular object within the operating environment 1300, to generate a safe trajectory through the operating environment 1300, and to operate the AV 100 to drive through the operating environment 1300 along the safe trajectory. The determination of the characteristics of a particular object of the one or more objects 1008 based on acoustic waves is described below. FIG. 16 below describes trajectory generation in the presence of multiple acoustic sources in more detail.

In an embodiment, the perception module 402 identifies a particular object in the operating environment 1300 using sensor data received from the sensors of the AV 100. The planning module 404 determines that a probability of a collision of the AV 100 with the particular object is greater than a threshold value. For example, the threshold value ranges between 1% and 5%. A probability of a collision of 1% means that there is a 1% chance that the AV 100 will collide with the particular object. The planning module 404 uses the dynamic characteristics of the particular object to predict that the particular object will move in a straight line at a constant speed. For example, the planning module 404 uses an extended Kalman filter to estimate a trajectory for the particular object. The planning module 404 also estimates a point and time of intersection between the estimated trajectory of the particular object and the planned trajectory of the AV 100. The planning module 404 determines potential behaviors for the particular object and assigns probabilities to each potential behavior to determine a probability of collision.

Examples of acoustic waves are illustrated and described below with reference to FIGS. 15A and 15B. The acoustic waves represent vibrations that propagate as pressure waves through a transmission medium such as the air in the operating environment 1300. For example, the acoustic waves are represented as variations in pressure over time. The acoustic waves received by the acoustic sensors 1304 have multiple wavelengths. For example, the acoustic waves are separated by the perception module 402 into component parts, which are a combination of multiple acoustic wavelengths (and noise). The perception module 402 clusters the acoustic waves into one or more acoustic clusters based on the multiple wavelengths present. In an embodiment, the perception module 402 clusters the acoustic waves by determining a change in a wavelength or a frequency of the acoustic waves based on filtering the acoustic waves. For example, the perception module 402 uses a gradient filter to filter the acoustic waves. The gradient filter determines discontinuities within the acoustic waves at which the properties of the acoustic waves change and outputs the filtered acoustic waves. The filtered acoustic waves are separated into the acoustic clusters at the regions of discontinuity.

In an embodiment, the perception module 402 clusters the acoustic waves by splitting the acoustic waves into the one or more acoustic clusters based on a spectrogram of the acoustic waves. A spectrogram is a representation of the spectrum of frequencies or wavelengths of the acoustic waves over time. The perception module 402 uses the spectrogram to split the acoustic waves into acoustic clusters over time. In an embodiment, adjacent acoustic clusters share a common time boundary, in other embodiments, adjacent acoustic clusters overlap. In an embodiment, the perception module 402 filters the acoustic waves based on peaks in the spectrogram of the acoustic waves to remove background noise. The peaks in the spectrogram represent points having a higher magnitude than neighboring points. If the AV 100 is next to another vehicle, the sound of the AV 100 or the other vehicle may interfere with acoustic tracking. Therefore, filtering the acoustic waves or the acoustic clusters is performed to compensate for acoustic measurements of the motion and position of the AV 100.

Background noise is emitted from, e.g., the AV 100 itself, pedestrians 192, or other objects that are not of interest in navigation of the AV 100. Noise signals are generally non-repeating signals and have a root mean square (RMS) amplitude that is used to filter the acoustic waves to remove the noise. In an embodiment, the perception module 402 clusters the acoustic waves by splitting the acoustic waves into the one or more acoustic clusters based on a time-frequency graph. For example, the perception module 402 analyzes the distribution of power in the acoustic waves into the frequency components composing the acoustic waves. The perception module 402 decomposes the acoustic waves into the acoustic clusters based on a number of discrete frequencies, or a spectrum of frequencies over a continuous range.

Each acoustic cluster of the one or more acoustic clusters corresponds to a respective object of the one or more objects 1008. The acoustic waves received by the acoustic sensors 1304 are diffracted, reflected, or interfered with by the particular object of the one or more objects 1008 and thus represent characteristics of the particular object. For example, the acoustic waves bend or change direction as they travel around the edges of the particular object. An amount of the diffraction depends on a size of the particular object in relation to the multiple wavelengths of the acoustic waves. An amount of the reflection of the acoustic waves depends on the dissimilarity of the particular object and the air. For example, harder and smoother objects such as the vehicle 193 will reflect more sound. Two or more components of the acoustic waves interfere such that their amplitudes are added together (constructive interference) or the components are out of phase and the amplitudes are subtracted. The reflection of the acoustic waves also results in echoes and reverberation that the perception module 402 analyzes.

The perception module 402 selects a particular acoustic cluster of interest out of the one or more acoustic clusters based on signal processing of the one or more acoustic clusters. For example, the perception module 402 performs analog signal processing on the acoustic clusters using a passive filter, an active filter, or a voltage-controlled filter to separate the particular acoustic cluster. The perception module 402 performs continuous time filtering or discrete-time signal processing at discrete points in time to separate the particular acoustic cluster. The perception module 402 digitally processes the acoustic clusters using a digital circuit such as an ASIC, a field-programmable gate array, or a specialized digital signal processor (DSP chip), as illustrated and described above with reference to FIG. 3. For example, the perception module 402 selects the particular acoustic cluster based on stored knowledge of the frequencies emitted by idling vehicles, active vehicles, humans talking, emergency vehicle sirens, etc.

The perception module 402 associates a particular object of the one or more objects 1008 with the particular acoustic cluster. The perception module 402 determines a spatiotemporal location of the particular object using measurements of the acoustic field. For example, FIG. 16 below shows a beamforming system for localizing multiple acoustic sources. The acoustic field is described using physical quantities such as sound pressure and particle velocity. In an embodiment, the perception module 402 associates the particular object with the particular acoustic cluster by using a time difference of arrival method. For example, the acoustic sensors 1304 are used to identify the particular object by cross-correlating the acoustic sensor data between the acoustic sensors 1304. In an embodiment, the perception module 402 associates the particular object with the particular acoustic cluster by triangulation of the particular object. By measuring the direction of the particular object at two or more locations in the operating environment 1300 while driving, the perception module 402 triangulates the position of the particular object.

The perception module 402 generates an acoustic fingerprint of the particular object based on the particular acoustic cluster. The acoustic fingerprint is a condensed digital summary of the particular acoustic cluster generated from the acoustic waves associated with the particular acoustic cluster. The acoustic fingerprint is used to identify the particular object by locating similar fingerprints stored on the remote server 136 or the data storage unit 142. For example, an acoustic fingerprint is compared to a database of stored acoustic fingerprints in order to determine a make and model of a vehicle, or identify that a pedestrian is approaching the AV 100. In an embodiment, the perception module 402 generates the acoustic fingerprint by determining a zero crossing rate of the particular acoustic cluster. The zero-crossing rate is the rate of sign-changes along the acoustic waves associated with the particular object, e.g., the rate at which the acoustic waves change in magnitude from positive to zero to negative or from negative to zero to positive.

In an embodiment, the perception module 402 generates the acoustic fingerprint by determining a spectral density of the particular acoustic cluster. The spectral density is a measure of the frequency content of the particular acoustic cluster obtained from a sequence of time samples of the particular acoustic cluster. The acoustic fingerprint includes a measure of periodicities in the particular acoustic cluster including peaks at the frequencies corresponding to the periodicities. For example, the acoustic fingerprint includes a location and intensity of a number of the frequencies. In an embodiment, the perception module 402 generates the acoustic fingerprint by determining a spectral flatness of the particular acoustic cluster of the one or more acoustic clusters. The spectral flatness (also sometimes known as the tonality coefficient) is measured in decibels and quantifies the amount of peaks or resonant structure in the power spectrum of the particular acoustic cluster. FIG. 15A below shows an example amplitude spectrum of a vehicle horn, and FIG. 15B below shows an example STFT spectrum of a siren.

In an embodiment, the perception module 402 generates the acoustic fingerprint by determining peaks in a spectrogram of the particular acoustic cluster. The perception module 402 generates a spectrogram of the particular acoustic cluster and plots three dimensions of the particular acoustic cluster: frequency vs amplitude (intensity) vs time. The perception module 402 generates the acoustic fingerprint by determining points where there are peaks in the spectrogram (higher energy content). In an embodiment, the perception module 402 generates the acoustic fingerprint by determining an acoustic pressure of the particular acoustic cluster of the one or more acoustic clusters. The acoustic pressure is a local (dynamic) pressure deviation from the static or ambient (average or equilibrium) atmospheric pressure, caused by the particular acoustic cluster. The acoustic pressure is expressed in units of Pascal (Pa).

In an embodiment, the perception module 402 generates the acoustic fingerprint by determining a particle velocity of the particular acoustic cluster of the one or more acoustic clusters. The particle velocity of the particular acoustic cluster is the velocity of a particle in the air of the operating environment 1300 as it transmits the component of the acoustic waves corresponding to the particular acoustic cluster. The particle velocity is expressed in units of meter per second (m/s). In an embodiment, the particle velocity is measured using a logarithmic decibel scale called particle velocity level. In an embodiment, the perception module 402 generates the acoustic fingerprint by determining a particle displacement of the particular acoustic cluster. The particle displacement is a distance of a movement of a sound particle from its equilibrium position in the air as it transmits the components of the acoustic waves corresponding to the particular acoustic cluster. The SI unit of particle displacement is the meter (m). The particle displacement corresponds to the oscillations of air molecules in the operating environment 1300 with, and against, the direction in which the acoustic waves are travelling. A particle in the air undergoes displacement in accordance with the particle velocity of the acoustic waves traveling through the air.

In an embodiment, the perception module 402 generates the acoustic fingerprint by determining an acoustic intensity I of the particular acoustic cluster of the one or more acoustic clusters. The acoustic intensity I of the particular acoustic cluster is the power carried by the acoustic waves corresponding to the particular acoustic cluster per unit area in a direction perpendicular to that area. A unit of acoustic intensity I is watts per square meter (W/m$^2$). The perception module 402 determines the acoustic intensity I by I=p×v, where p is the acoustic pressure and v is the particle velocity. Both I and v are vectors having a direction and a magnitude. The perception module 402 determines the acoustic intensity I using two acoustic sensors of the AV 100.

The perception module 402 determines characteristics of the particular object based on the acoustic fingerprint of the particular object. For example, the perception module 402 determines the spatiotemporal location of the particular object using the acoustic location methods described above with reference to associating the particular object with a particular acoustic cluster. FIG. 16 below shows a beamforming system for localizing multiple acoustic sources. For example, the perception modules 402 uses physical quantities such as sound pressure or particle velocity, or use the time difference of arrival. In an embodiment, the characteristics include physical characteristics of the particular object. The perception module 402 determines the characteristics of the particular object by generating a hash of peaks in a spectrogram of the acoustic waves. The hash of peaks is a function used to map the points of peak amplitude in the spectrogram onto hash values or hash codes.

The perception module 402 extracts an acoustic fingerprint from a spectrogram as described above. The perception module 402 determines salient points in each region of the spectrogram that are not a result of background noise. In an embodiment, the perception module 402 generates the hash of peaks by segregating the spectrogram into zones and generating the hash value for each peak pair in the zone. The perception module 402 determines the physical characteristics of the particular object by searching a database of characteristics based on the hash values to determine the physical characteristics. The database is stored in the data storage unit 142 or on the remote server 136. The AV 100 uses a hash of frequencies of several peak points to reduce the number of hash collisions and speed up searching of the database to identify vehicles.

In an embodiment, the perception module 402 determines the characteristics of the particular object by determining dimensions of the particular object. For example, if the particular object is a vehicle 193, the perception module 402 uses the acoustic fingerprint of the particular object to perform a look-up in a database of dimensions of vehicles stored in the data storage unit 142 to determine the dimensions. In an embodiment, the AV 100 transmits the acoustic fingerprint to the machine learning module 1312, which is trained to receive an acoustic fingerprint and generate determine a size, or a make or a model of a vehicle 193, or the dimensions of another object corresponding to the acoustic fingerprint.

In an embodiment, the perception module 402 determines whether the particular object is an inactive vehicle based on the acoustic fingerprint. For example, a stationary vehicle whose engine is running will have a different acoustic fingerprint than a moving vehicle. The perception module 402 uses the acoustic fingerprint to perform a look-up in a database of acoustic fingerprints stored in the data storage unit 142 to determine whether the particular object is an inactive vehicle. In an embodiment, the perception module 402 determines whether the particular object is a vehicle that has a running engine based on the acoustic fingerprint. For example, the perception module 402 generates the acoustic fingerprint based on the acoustic waves received from the vehicle. The acoustic waves will differ based on the engine sound, which is based on the gear that the vehicle is using and the vehicle's speed. The acoustic fingerprint will also differ based on a vehicle's gear, speed, acceleration, or direction. The AV 100 thus derives the gear state of a moving vehicle to determine its likely speed and acceleration.

The AV 100 uses engine noise from active vehicles that are temporarily stopped as extra cues for trajectory generation by the planning module 404. For example, if an active vehicle is temporarily stopped, the AV 100 uses visual cues extracted from the active vehicle to match to traffic rules. The AV 100 also uses its acoustic sensors 1304 to distinguish between inactive vehicles and active vehicles that are temporarily stopped. The AV 100 reduces lateral clearance from an inactive vehicle to drive around it. If an active vehicle is temporarily stopped at a red light but the cameras of the AV 100 cannot see the red light, the AV 100 determines that the engine of the active vehicle is on and the AV 100 should not violate the red light.

In an embodiment, the perception module 402 detects a change in a frequency of the acoustic waves. The change in the frequency is a result of a particular object's speed or position relative to the AV 100. The perception module 402 determines a speed of the particular object relative to the AV 100 based on the change in the frequency. For example, the perception module 402 uses the Doppler Effect to determine the speed of the particular object relative to the AV 100. The Doppler Effect refers to a change in frequency or wavelength of the acoustic waves in relation to the AV 100. When the particular object is moving towards the AV 100, each successive acoustic wave crest is emitted from a position closer to the AV 100 than the crest of the previous acoustic wave. Therefore, each acoustic wave takes slightly less time to reach the AV 100 than the previous acoustic wave. Hence, the time between the arrival of successive acoustic wave crests at the AV 100 is reduced, causing an increase in the frequency or decrease in wavelength. In an embodiment, the perception module 402 similarly detects a change in a wavelength of the acoustic waves. The perception module 402 determines a speed of the particular object relative to the AV 100 based on the change in the wavelength as described above.

The planning module 404 generates a trajectory for the AV 100 to avoid a collision with the object based on the speed of the object relative to the vehicle. For example, the planning module 404 uses a directed graphical representation of the operating environment 1300 to generate the trajectory. An example of such a directed graphical representation 1000 is illustrated and described above with reference to FIG. 10. The planning module 404 determines a probability of collision with the object by determining a first set of points in the operating environment 1300 that represent a position of the AV 100 at different times. A second set of point that represent a position of the particular object at the different times is also determined. Intersections of the two sets is used to identify potential collisions and navigate around them. FIG. 16 below describes trajectory generation in the presence of multiple acoustic sources.

Each acoustic sensor of the one or more acoustic sensors 1304 is located at a respective position on the AV 100 to capture acoustic waves from different directions. The perception module thus determines multiple intensities of the acoustic waves based on the relative positions of the one or more acoustic sensors 1304. The multiple intensities and a difference between intensities captured by different acoustic sensors is used to determine a directional orientation of the particular object. For example, the perception module 402 uses a difference in arrival times between different acoustic sensors, the relative amplitude of high-frequency sounds between different acoustic sensors, or a ratio of the direct acoustic waves to reverberated acoustic waves to determine a directional orientation of the particular object.

In an embodiment, the perception module 402 determines a level of confidence in identifying an object in the operating environment 1300 based on the electromagnetic radiation sensor data received using the one or more electromagnetic radiation sensors 1308. The level of confidence denotes how good the identification is. For example, the level of confidence ranges from 0% to 100%. The perception module 402 identifies the object using, for example, LiDAR data, camera images, or video, as described above with reference to FIG. 4. The perception module 402 determines a level of confidence in identifying the object based on closely the electromagnetic radiation sensor data matched previously known features. If the confidence level is relatively low such as 15%, there could be a mismatch in the object identification using the electromagnetic radiation sensor data.

Responsive to the level of confidence being less than a threshold value such as 30%, the perception module 402 further determines physical characteristics of the object based on acoustic waves received from the object to increase the level of confidence. The threshold value is set higher (e.g., 0.9 or 90%) or lower (0.3 or 30%) depending on the level of accuracy desired. The determination of the physical characteristics is performed, for example, using the methods described above. If the level of confidence of the perception module 402 in identifying the object based on the electromagnetic radiation sensor data is less than the threshold value, the perception module 402 uses the acoustic waves to increase the level of confidence. The perception module 402 generates an acoustic fingerprint of the object, as described above, and uses the acoustic fingerprint to identify the object. If the acoustic fingerprint of the object matches an acoustic fingerprint of the entity identified using the electromagnetic radiation sensor data, the perception module 402 increases the level of confidence in the object identification.

In an embodiment, the perception module 402 uses the acoustic waves to determine that an object is a static object such as a building. The perception module 402 determines the object is a building based on the physical characteristics and the spatiotemporal location. For example, the perception module 402 determines the spatiotemporal location of the object and determines that the spatiotemporal location of the object corresponds to a location of a building in a map of the operating environment 1300. The map is stored in the data storage unit 142 or retrieved from the remote server 136 as needed by the AV 100.

The perception module 402 determines from the acoustic waves that the object is not moving. The perception module 402 determines that the acoustic waves are reflected off different sides of the building. The perception module 402 determines a width or depth of the building based on echoing, reflections, or reverberations of the acoustic waves. In an embodiment, the perception module 402 identifies a side of the building that the AV 100 is located on based on the physical characteristics of the building. For example, the perception module 402 uses the echoing, reflections, or reverberations of the acoustic waves to determine which of the walls of the building the acoustic waves are bouncing off. The perception module 402 further uses the map as well as a GNSS module of the AV 100 to determine a side of the building that the AV 100 is located on. The GNSS module determines the spatiotemporal location of the AV 100. The AV 100 uses its spatiotemporal location relative to the locations of the sides of the building in the map to determine which side of the building the AV 100 is located on.

In an embodiment, the AV 100 determines that the AV 100 is located on a boundary of a map of the operating environment 1300. For example, the AV 100 uses its IMU, GNSS unit, or localization data from the remote server 136 to determine its spatiotemporal location. The AV 100 accesses a map of the operating environment 1300 stored in the data storage unit 142 or on the remote server 136. The AV 100 determines that its spatiotemporal location corresponds to a boundary of the map such that the topography or road network beyond the map is unknown. The AV 100 further uses the acoustic waves to determine, as described in detail above, that a particular object is located outside the map.

In an embodiment, the AV 100 generates a hypothetical vehicle corresponding to the particular object, wherein the hypothetical vehicle is located outside the map. For example, the particular object is not visible to the electromagnetic radiation sensors 1308 of the AV 100 because the particular object is occluded or the perception module is unable to identify the particular object with a high level of confidence. If the AV 100 did not generate the hypothetical vehicle, the planning module 404 would have to drive very conservatively, for example, stop or slow down, in the unmapped region outside the map. However, by generating the hypothetical vehicle and predicting its location and behavior, the planning module 404 increases a level of aggressiveness in operation of the AV 100 based on the location of the hypothetical vehicle. For example, the AV 100 maintains its trajectory and speed if there is no probability of collision with the hypothetical vehicle. In an embodiment, the AV 100 determines a level of confidence in the generation of the hypothetical vehicle as described above with reference to determining a level of confidence in identifying the particular object.

In an embodiment, the planning module 404 adjusts one or more weights of a graphical representation of the operating environment 1300 based on the location of the hypothetical vehicle. The weights of the graphical representation represent a number of other vehicles on different lane segments in the operating environment 1300. The graphical representation of the operating environment 1300 is thus used to drive a directed graph search for trajectory generation. By adjusting the weights based on the location of the hypothetical vehicle, the planning module 404 increases the accuracy of the graphical representation. The planning module 404 thus generates a more-efficient trajectory for the AV 100 based on the adjusted graphical representation as described above. FIG. 16 below describes trajectory generation in the presence of multiple acoustic sources. The AV 100 thus adjusts weights of a path planning graph 1000 to reflect the presence of inactive and actively stopped vehicles, and generate a trajectory using the adjusted path planning graph.

In an embodiment, the AV 100 identifies a failure in the one or more electromagnetic radiation sensors 1308. The failure is identified when an expected output from a built-in self-test (BIST) module of the electromagnetic radiation sensors 1308 is not received, thus indicating the failure. Responsive to identifying the failure, the planning module 404 generates a trajectory for the AV 100 based on the acoustic waves. For example, the acoustic waves are used to detect and identify a particular object in the operating environment 1300 as described above. The planning module 404 generates the trajectory to avoid a collision with the particular object.

In an embodiment, the planning module 404 or remote server 136 aggregates the road network connectivity of the operating environment 1300 to generate a graphical representation of the operating environment 1300. An example of such a graphical representation is the directed graph 1000 described and illustrated above with reference to FIG. 10. For example, the planning module 404 receives electromagnetic radiation sensor data representing the topography of the road network and the presence and characteristics of static objects using the one or more electromagnetic radiation sensors 1300. The planning module 404 generates the graphical representation of the operating environment 1300 based on the electromagnetic radiation sensor data.

The graphical representation of the operating environment 1300 is implemented using a data structure, for example, a linked list or a multi-dimensional array. The planning module 404 receives a description of a desired operation for the AV 100 and uses the graphical representation to generate a trajectory for the AV 100. In one embodiment, the graphical representation is overlaid on a traffic map. An example graphical representation (graph 1000) is illustrated and described above with reference to FIG. 10. From each vertex, the AV 100 is allowed to move to adjacent vertices as long as the path between them avoids a collision with a particular object.

In an embodiment, the graphical representation of the operating environment 1300 is updated in real time using sources of traffic data. In an embodiment, historically stored data is used to augment the graphical representation. For example, the historical data of the average time of day at which people leave their offices to drive home is used to determine the times at which a highway is most congested. Such data is used to generate or augment the graphical representation.

The edges of the graphical representation generated by the planning module 404 are weighted in accordance with a number of other vehicles traveling on lane segments corresponding to the edges. For example, the weight of each lane segment is 1 times, 1.5 times, or 3.57 times the number of vehicles operating on the lane segment such that if there are 5 vehicles operating on the lane segment, the weight is 1, 7.5, or 17.85. The planning module 404 obtains information from a traffic map to perform the weighting or use location data received from the AV 100 and the remote server 136 to perform the weighting. The traffic information and locations of other vehicles 193 are thus used to construct the weighted graph structure (graphical representation). The planning module 404 updates the weights of one or more lane segments in the graphical representation after receiving the spatiotemporal location of each other vehicle 193 in the operating environment 1300.

In an embodiment, a particular object is occluded from the one or more electromagnetic radiation sensors 1308 of the AV 100. This could be because there is another object between the particular object and the electromagnetic radiation sensors 1308 or because of weather conditions such as fog, rain, or mist. The perception module 402 determines characteristics of the particular object based on the acoustic waves as described in detail above. The perception module 402 determines a spatiotemporal location of the particular object based on the acoustic waves as described in detail above. The characteristics include physical dimensions of the particular object. The AV 100 typically generates a path planning graphical representation using visual data from its visual sensors. There are gaps in the graphical representation due to occluded cameras or LiDAR. The AV 100 uses the acoustic data to fill in such gaps.

The AV 100 further determines a location of a blind spot. The blind spot is a spatiotemporal location of the operating environment 1300 that is not visible to the one or more electromagnetic radiation sensors 1308 of the AV 100. For example, an object in the blind spot will not be represented in the electromagnetic radiation sensor data. The perception module 402 uses location matching to determine whether the spatiotemporal location of the particular object corresponds to the blind spot of the AV 100. For example, the AV 100 detects a spatiotemporal location of the operating environment 1300 that corresponds to a blind spot of the AV 100 before changing lanes and use the acoustic waves to determine if there is a vehicle 193 or a pedestrian 192 in the blind spot. The planning module 404 generates an updated graphical representation of the operating environment 1300 based on the characteristics of the particular object and the spatiotemporal location of the particular object. In an embodiment, the planning module 404 generates the updated graphical representation by performing sensor fusion using the one or more electromagnetic radiation sensors 1308 and the one or more acoustic sensors 1304 of the AV 100. The planning module 404 uses sensor fusion to combine the electromagnetic radiation sensor data and the acoustic sensor data for improving the trajectory generation. The sensor fusion reduces the deficiencies of the individual sensors to determine the position and orientation of the particular object. In other embodiments, when cameras or LiDAR of the AV 100 malfunction, the AV 100 switches over to using acoustic tracking.

In an embodiment, the AV 100 uses the machine learning module 1312 to determine that an emergency situation is occurring based on electromagnetic radiation sensor data or acoustic sensor data from the operating environment 1300. The machine learning module 1312 determines a type of the emergency based on features extracted from the electromagnetic radiation sensor data or acoustic sensor data as described and illustrated below with reference to FIG. 14. The planning module abandons its previous trajectory and retrieves a new operation to be performed by the AV 100 based on the type of the emergency. A retrievable list of such AV operations is stored in the data storage unit 142 or retrieved from the remote server 136. The control module control 406 of the AV 100 operates the AV 100 in accordance with the operation as described below.

The acoustic transmitters 1316 convert electrical signals into ultrasound signals and transmit the ultrasound signals towards target objects. In an embodiment, the acoustic transmitters 1316 include ultrasound receivers to convert reflected ultrasound signals into electrical signals to determine characteristics of a target object. The operation of the acoustic transmitters 1316 is further described below with reference to FIG. 14.

The AV 100 includes one or more loudspeakers 1320 that broadcast or transmit audio messages or communications from the AV 100 to entities external to the AV 100, for example, in an emergency. In an embodiment, an acoustic transmitter 1316 and a loudspeaker 1320 are part of the same unit or module. In an embodiment, a loudspeaker 1320 of the AV 100 is a smart speaker. The smart speaker receives voice commands using one or more near-field or far-field microphones. In an embodiment, the smart speaker includes or is connected to a smart assistant. Operation of the loudspeakers is described further below with reference to FIG. 14.

The control module 406 operates the AV 100 in accordance with a trajectory generated by the planning module 404 as described above. The control module 406 is illustrated and described above with reference to FIG. 4. The control module 406 operates the AV 100 to avoid a collision with the particular object identified by the perception module 402 based on the characteristics of the particular object. In an embodiment, the control module 406 operates the AV 100 to avoid a collision with the particular object based on the updated graphical representation of the operating environment 1300. For example, the updated graphical representation includes the spatiotemporal location of the particular object, and the control module 406 operates the AV 100 around the particular object. The control module 406 uses the trajectory from the planning module 404 to operate the brakes 420c, steering 420a, and throttle 420b (shown and described above with reference to FIG. 4) of the AV 100. In an embodiment, the control module 406 operates the AV 100 within a discretized drivable area of the operating environment 1300 in accordance with the trajectory. Based on the trajectory, the control module 406 operates the steering control 102, brakes 103, gears, or accelerator pedal.

Machine Learning Framework for Autonomous Vehicle Operation

Figure 14:
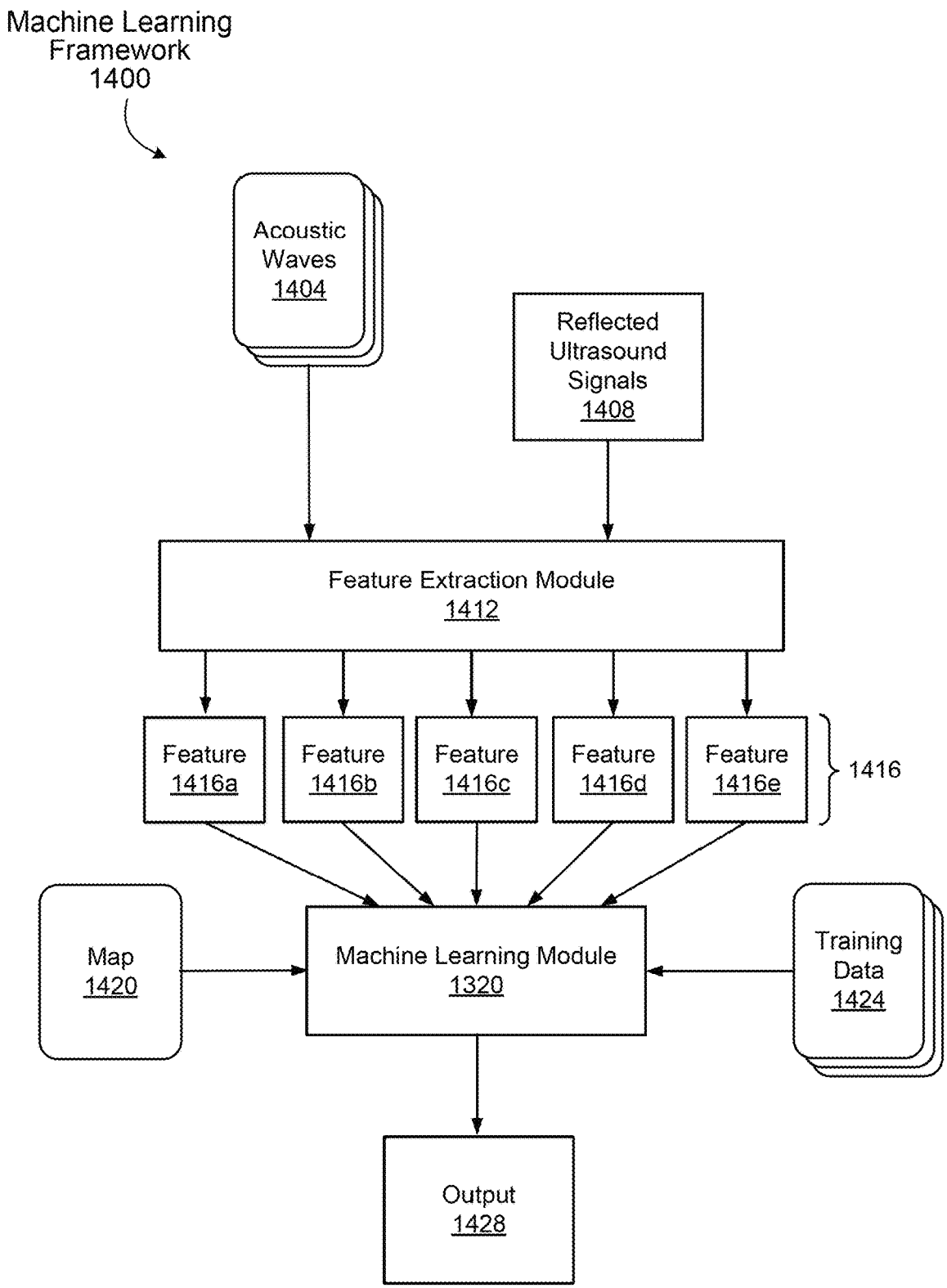
FIG. 14 shows a machine learning framework for autonomous vehicle operation using acoustic modalities, in accordance with one or more embodiments.

FIG. 14 shows a machine learning framework 1400 for autonomous vehicle operation using acoustic modalities, in accordance with one or more embodiments. The machine learning framework 1400 includes a feature extraction module 1412 and the machine learning module 1312. In other embodiments, the machine learning framework 1400 includes additional or fewer components than those described herein. Similarly, the functions are distributed among the components and/or different entities in a different manner than is described here.

The feature extraction module 1412 extracts a feature vector 1416 from the acoustic waves 1404 received using the one or more acoustic sensors 1304 of the AV 100. The feature extraction module 1412 may be implemented in software using the computer processor 304 or in special-purpose hardware as described above with reference to FIG. 3. The feature vector 1416 is a compact representation of the information in the acoustic waves 1404 and is used as input by the machine learning module 1312. For example, the feature extraction module 1412 extracts the feature vector 1416 by determining a zero crossing rate of the acoustic waves 1404. The feature 1416a thus represents the zero crossing rate of the acoustic waves 1404. Zero crossing rate is described above with reference to FIG. 13. In an embodiment, the feature extraction module 1412 applies dimensionality reduction such as linear discriminant analysis (LDA), principle component analysis (PCA), or the like to reduce the amount of data in the feature vector 1416 to a smaller, more representative set of data.

In an embodiment, the feature extraction module 1412 extracts the feature vector 1416 by determining a spectral density of the particular acoustic cluster of the one or more acoustic clusters. The feature 1416b thus represents the spectral density of the particular acoustic cluster. Spectral density is described above with reference to FIG. 13. In an embodiment, the feature extraction module 1412 extracts the feature vector 1416 by determining a spectral flatness of the acoustic waves 1404. The feature 1416c thus represents the spectral flatness of the acoustic waves 1404. Spectral flatness is described above with reference to FIG. 13. In an embodiment, the feature extraction module 1412 extracts the feature vector 1416 by determining peaks in a spectrogram of the acoustic waves 1404. The feature 1416c thus represents the peaks in a spectrogram of the acoustic waves 1404. Peaks in a spectrogram are described above with reference to FIG. 13. In an embodiment, the feature extraction module 1412 extracts the feature vector 1416 by determining an acoustic pressure of the acoustic waves 1404. The feature 1416c thus represents the acoustic pressure of the acoustic waves 1404. Acoustic pressure is described above with reference to FIG. 13.

The machine learning module 1312 is a mathematical and connectivity model that is trained using the feature vector 1416 to make predictions or decisions (e.g., the output 1428) without being explicitly programmed. In an embodiment, the machine learning module 1312 receives training data

1424 including labeled features representing an emergency. For example, the emergency is associated with an audio siren produced by an emergency vehicle, a sound of an explosion, a sound of an accident, gunshot sounds, or a sound of people shouting or crying. The machine learning module 1312 is trained to receive the labeled features and generate a score (e.g., the output 1428) indicative of a probability that the labeled features indicate an emergency. For example, the score lies between 0 and 1, or between 0% and 100%. The machine learning module 1312 is trained using one or more machine learning methods. In some embodiment, a k-nearest neighbors method is used. The k-nearest neighbors method is used for classification and regression. For both classification and regression, the data set consists of the k closest training examples in the feature vector space.

In an embodiment, a support vector machine method is used. Support vector machines use supervised learning to train the machine learning module 1312 with associated learning algorithms that analyze the feature vector that is used for classification and regression analysis. The machine learning module 1312 is presented with a set of training examples, each marked as belonging to one or the other of two categories. The support vector machine method trains the machine learning module 1312 to assign new examples to one category or the other, making it a non-probabilistic binary linear classifier. In an embodiment, the machine learning module 1312 uses a gradient boosting method, a gradient boosting classifier method, or a decision tree classifier method. In other embodiments, different machine learning techniques such as linear support vector machine (linear SVM), boosting for other algorithms (e.g., Ada-Boost), logistic regression, naïve Bayes, memory-based learning, random forests, bagged trees, boosted trees, boosted stumps, neural networks, or a convolutional neural network (CNN) is used.

The AV 100 transmits the feature vector 1416 to the machine learning module 1312. The trained machine learning module 1312 receives the features 1416 and generates a score (e.g., the output 1428) indicative of a probability that the one or more features 1416 indicate an emergency. For example, the score lies between 0 (no emergency) and 1 (the machine learning module 1312 is certain there is an emergency), or between 0% and 100%. In an embodiment, the machine learning module 1312 performs deep learning (also known as deep structured learning or hierarchical learning) to learn data representations, as opposed to using task-specific algorithms. In deep learning, no explicit feature extraction is performed; the features may be implicitly extracted by the machine learning module 1312. For example, the machine learning module 1312 uses a cascade of multiple layers of nonlinear processing units for implicit feature extraction and transformation. Each successive layer uses the output from the previous layer as input. The machine learning module 1312 thus learns in supervised (e.g., classification) and/or unsupervised (e.g., pattern analysis) modes. The machine learning module 1312 learns multiple levels of representations that correspond to different levels of abstraction, wherein the different levels form a hierarchy of concepts. In an embodiment, the machine learning module 1312 is trained to receive the feature vector 1416 and generate output 1428 indicating a size, or a make or a model of a vehicle that is emitting the acoustic waves 1404.

In an embodiment, information from the map 1420 is used to validate the output 1428 or processing of the machine learning module 1312. The map 1420 is a traffic map of the operating environment 1300 that is continuously updated by law enforcement or satellite data indicating emergency locations, accidents, traffic jams, etc. The map 1420 is used to crosscheck the output 1428 of the machine learning module 1312 to determine whether the map 1420 also indicates an emergency at a particular spatiotemporal location.

In an embodiment, responsive to the score being greater than a threshold value, the AV 100 transmits a message to the remote server 136 indicating the emergency. For example, the threshold value lies between 50% and 70%. The threshold value is tuned such that the AV 100 does not respond to minor emergencies. If the score is 90%, the AV 100 transmits a message to the server 136 indicating an emergency and requesting further instructions from the server 136. For example, the AV 100 uses the communications devices 140 shown and described above with reference to FIG. 1 to perform the transmitting. The AV 100 hands over control of its sensors and cameras to the remote server 136 for further investigation of the emergency by the remote server 136.

In an embodiment, responsive to the score being greater than a threshold value, the machine learning module 1312 is used to identify a type of the emergency (e.g., the output 1428) based on the feature vector 1416. For example, the threshold value lies between 50% and 70%. If the score is 90%, the AV 100 transmits the feature vector 1416 to the machine learning module 1312 to identify a type of the emergency. The machine learning module 1312 identifies the type of the emergency by matching the feature vector 1416 to a database. For example, the database includes a look-up table of types of emergencies indexed by feature vectors 1416 and is stored in the data storage unit 142 or remote server 136. The types of the emergency include an explosion, a fire, an accident, a siren from an emergency vehicle, a sound of people shouting or crying, gunshot sounds, a combination thereof, or another type of emergency that is identified using the acoustic waves 1404.

In an embodiment, responsive to the score being greater than a threshold value, the one or more acoustic transmitters 1316 of the AV 100 emit ultrasound signals. For example, the score lies between 0% and 100%. If the threshold value is 90% and the score is 95%, the acoustic transmitters 1316 emit ultrasound signals towards the source of the acoustic waves 1404. The acoustic transmitters 1316 include ultrasonic transducers used to evaluate target objects by interpreting the reflected ultrasound signals 1408. For example, by measuring the time between sending ultrasound signals and receiving an echo 1408, the distance of the target object or features of the target object are determined. The acoustic transmitters 1316 are part of the same unit or module as the acoustic sensors 1304. The acoustic sensors 1304 receive the reflected ultrasound signals 1408 from the operating environment 1300 in which the AV 100 is located. The AV 100 detects the emergency based on the reflected ultrasound signals 1408. For example, the detecting of the emergency based on the reflected ultrasound signals 1408 is performed by the machine learning module 1312. The feature extraction module 1412 extracts a feature vector 1416 from the reflected ultrasound signals 1408 and transmit the feature vector 1416 to the machine learning module 1312 to detect the emergency based on the reflected ultrasound signals 1408. The machine learning module 1312 is trained to receive the feature vector 1416 based on the reflected ultrasound signals 1408 and produce output 1428 indicating whether the reflected ultrasound signals 1408 indicate an emergency. This provides a greater degree of confidence in detecting and confirming the emergency.

In an embodiment, responsive to the score being greater than a threshold value, the AV 100 receives one or more images using one or more visual sensors of the AV 100. The same threshold values described above are used or a different threshold value is used. The visual sensors are part of the electromagnetic radiation sensors 1308 as described above with reference to FIGS. 6-8. The AV 100 transmits the one or more images to the remote server 136 such that the remote server 136 performs a teleoperation or reports the emergency to law enforcement or emergency services.

In an embodiment, responsive to the score being greater than a threshold value, the control module 406 operates the AV 100 toward a source of the acoustic waves 1404. For example, if the AV 100 is an autonomous ambulance, it offers assistance to a wounded person. FIG. 16 below shows a beamforming system for localizing multiple acoustic sources. The same threshold values described above are used or a different threshold value is used. The control module 406 operates the AV 100 toward a source of the acoustic waves 1404 if the determined type of the emergency indicates no threat to the passengers in the AV 100 or the AV 100 itself. For example, if the AV 100 identifies a child is crying, the control module 406 operates the AV 100 toward a source of the acoustic waves 1404. In an embodiment, the loudspeaker 1320 of the AV 100 broadcasts an audio message toward the source of the acoustic waves 1404. For example, the audio message includes a telephone number to call for help, state that "There is a Police Station 1 mile Away," or state that "The Police Are on the Way." In an embodiment, the AV 100 presents a visual message to the source of the acoustic waves 1404 using a display device 312 of the AV 100. The display device 312 is shown and described above with reference to FIG. 3.

In an embodiment, based on the type of the emergency determined, the AV 100 uses the control module 406 to unlock a door of the AV 100 to offer assistance or supplies. The control module 406 unlocks a door of the AV 100 if the determined type of the emergency indicates no threat to the passengers in the AV 100 or the AV 100 itself. For example, if the AV 100 identifies a child is crying or a minor accident (e.g., a fender bender has occurred) the control module 406 unlocks a door of the AV 100 to offer assistance or supplies. If the AV 100 determines that a situation is non-threatening, the AV 100 unlocks its doors and offer a ride to a hospital to a human in the emergency (e.g., medical emergency).

In an embodiment, the AV 100 transmits a message representing the type of the emergency to an emergency vehicle such as an ambulance or a police vehicle. For example, if the AV 100 detects that an accident has occurred and a police vehicle is nearby, the AV 100 transmits a message to the police vehicle offering information the AV 100 has determined related to the accident. In an embodiment, the AV 100 retrieves using the communication device 140 an operation for the AV 100 to perform based on the type of the emergency. For example, the AV 100 retrieves the operation from the data storage unit 142 or the remote server 136. In an embodiment, the AV 100 receives instructions for performing the operation from the remote server 136.

The control module 406 operates the AV 100 in accordance with the operation as described above with reference to FIG. 13. For example, the control module 406 operates the steering 420*a*, brakes 420*c*, and throttle 420*b* of the AV 100 to perform the operation.

In an embodiment, the AV 100 receives the map 1420 of the operating environment 1300 in which the AV 100 is located from the remote server 136. The map 1420 includes one or more acoustic fingerprints indicating activity or objects present at different spatiotemporal locations within the operating environment 1300. For example, if there is a noisy factory present at a particular spatiotemporal location that has a particular audio signature, an acoustic fingerprint of acoustic waves 1404 emitted by the factory will be embedded into the map 1420 at the particular spatiotemporal location. The AV 100 compares an acoustic fingerprint in the map 1420 to the feature vector 1416 to determine a match. A match indicates that the AV 100 has determined its own location correctly using its GNSS sensors or IMU, the AV 100 has correctly identified an emergency, or that the AV 100 has identified a false positive.

In an embodiment, the AV 100 annotates the map 1420 of the operating environment 1300 in which the AV 100 is located using the feature vector 1416 or an acoustic fingerprint. The AV 100 therefore creates an audio map of the operating environment 1300 using acoustic signatures in a mapping mode. The AV 100 embeds computer-readable semantic icons corresponding to the feature vector 1416 or an acoustic fingerprint within the map 1420 at a particular spatiotemporal location. These computer-readable semantic icons are used by other AVs to route away from the particular spatiotemporal location (because of the emergency) or by law enforcement or emergency services to respond to an emergency at the particular spatiotemporal location. In an embodiment, the AV 100 annotates acoustic signatures into the map 1420 in normal operation, such that if the AV 100 perceives a very different fingerprint later, it may signal an emergency situation or trigger a warning to communicate with the remote server 136.

Example Amplitude Spectrums

Figure 15A:
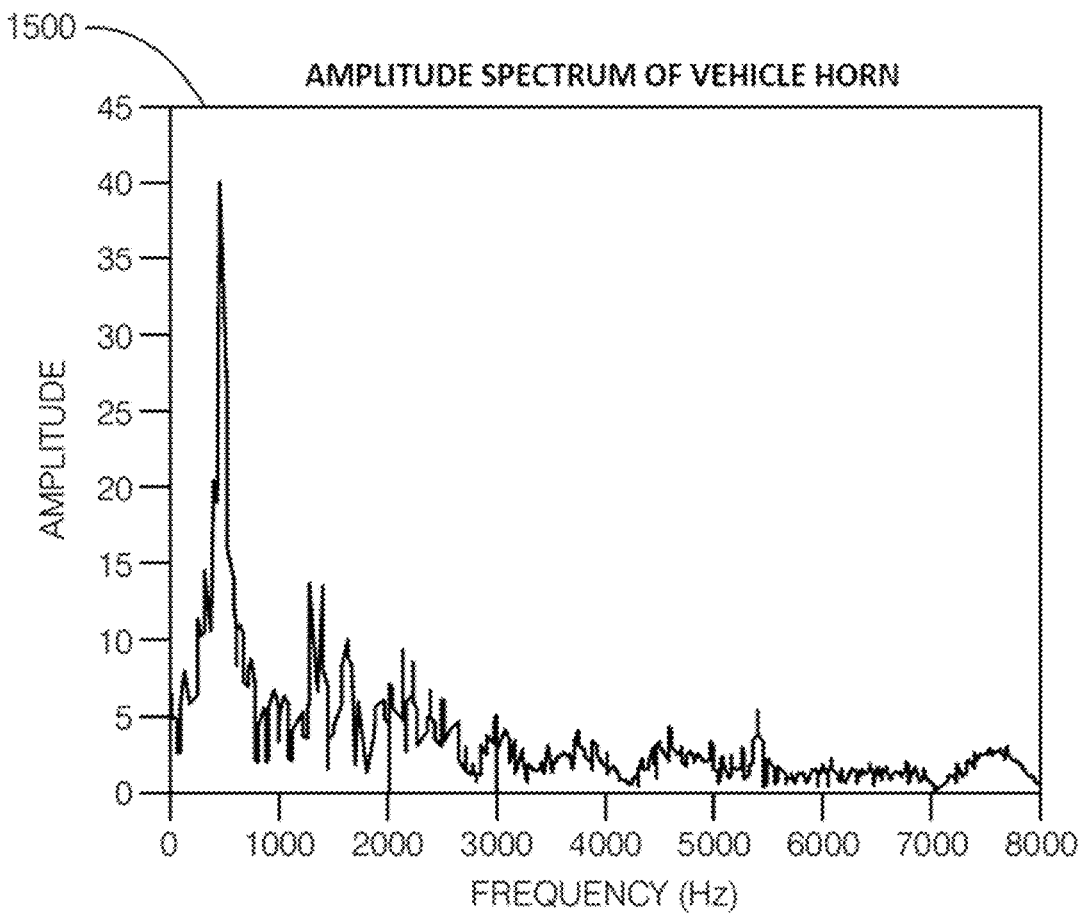
FIG. 15A shows an example amplitude spectrum of a vehicle horn, in accordance with one or more embodiments.
Figure 15B:
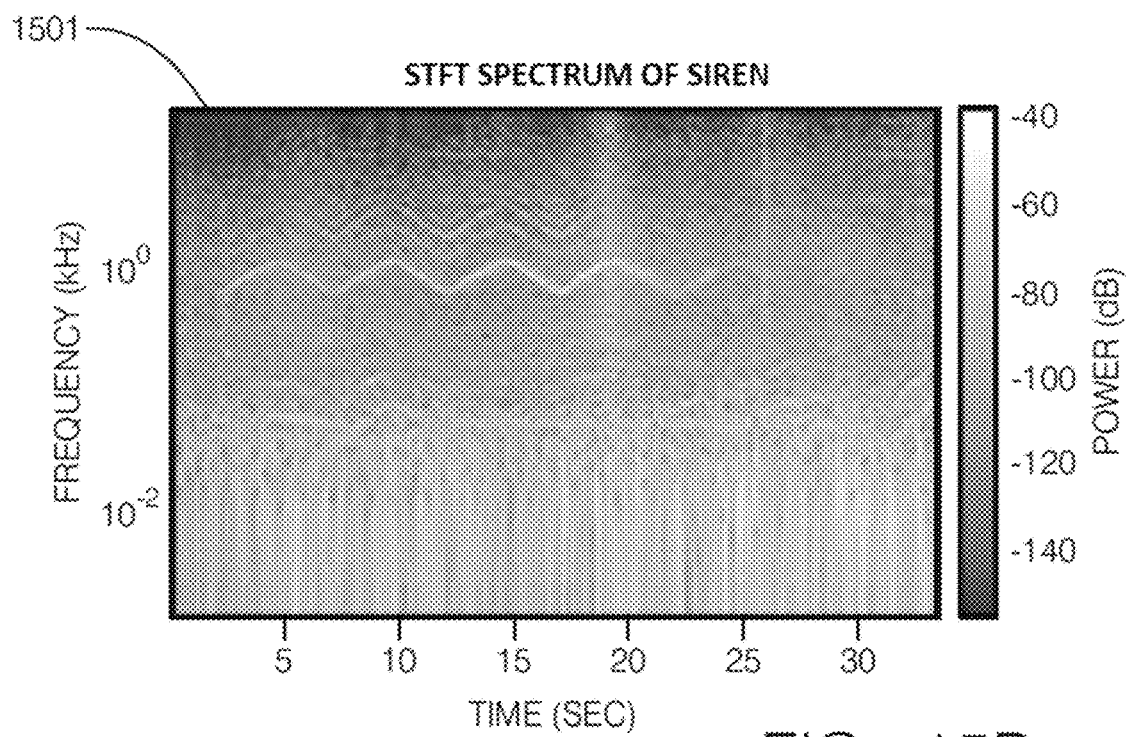
FIG. 15B shows an example STFT spectrum of a siren, in accordance with one or more embodiments.

FIG. 15A shows an example amplitude spectrum of a vehicle horn, in accordance with one or more embodiments. In an embodiment, the machine learning module 1312 classifies the acoustic waves 1404 from the ambient sound in the operating environment 1300 by computing a frequency spectrum of the acoustic waves 1404. An amplitude spectrum of a car horn may look like the example amplitude spectrum 1500 shown in FIG. 15A. Note the peak energy below 1000 Hz. The amplitude spectrum 1500 is computed using a Fast Fourier Transform (FFT). The amplitude spectrum is matched to a reference amplitude spectrum in a database of reference amplitude spectrums to classify the sound. The database of reference amplitude spectrums are stored in the data storage unit 142 or on the remote server 136. Vehicle horns and sirens are single tone or dual tone and usually fall in the frequency range of 400 Hz and 2K Hz. Some horns and sirens have alternating tones (frequency sweeping). Such sirens are analyzed using a short-time Fourier transform (STFT) which may look like the example STFT spectrum 1501 shown in FIG. 15B. The STFT is a Fourier-related transform used to determine the sinusoidal frequency and phase content of local sections of a signal as it changes over time.

Beamforming System for Localizing Multiple Acoustic Sources

FIG. 16 shows a beamforming system for localizing multiple acoustic sources, in accordance with one or more embodiments. The system 1600 includes a processing circuit 1601, antennas 1602*a*-1602*d*, multipliers 1603*a*-1603*d*, an adaptive module 1604, a summer 1605 and a summer 1606. The processing circuit 1601 implements delay-and-sum (DAS) operations by adaptively adjusting weights (w1-w4) using the multipliers 1603*a*-1603*d* to adjust delays in the signals received from antennas 1602*a*-1602*d*. Adjusting the delays causes the main-lobe 1607 to be steered in a desired direction in the search space that maximizes the beamforming signal y(t). The adaptive module 1604 receives an error signal e(t) from the summer 1606 that is the difference between the beamforming signal and a desired reference signal d(t). The adaptive module 1604 adjusts the weights until the error signal e(t) is minimized.

The beamforming system 1600 is used to learn the direction of arrival (DOA) and distances of multiple acoustic sources. The distances and directions of the acoustic sources and their respective labels are input into perception module 402. The perception module 402 uses the directions and distances to determine the locations of the acoustic sources on the map 1420 retrieved from the data storage unit 142 or the remote server 136. The perception module 402 also receives a vision scene with labeled bounding boxes that have been enhanced with acoustic information. The planning module 404 uses the map 1420 having the acoustic source locations and vision scene to plan a route or trajectory through the operating environment 1300 as described in reference to FIGS. 9 and 10.

Vision Scene with Acoustic Information

Figure 17A:
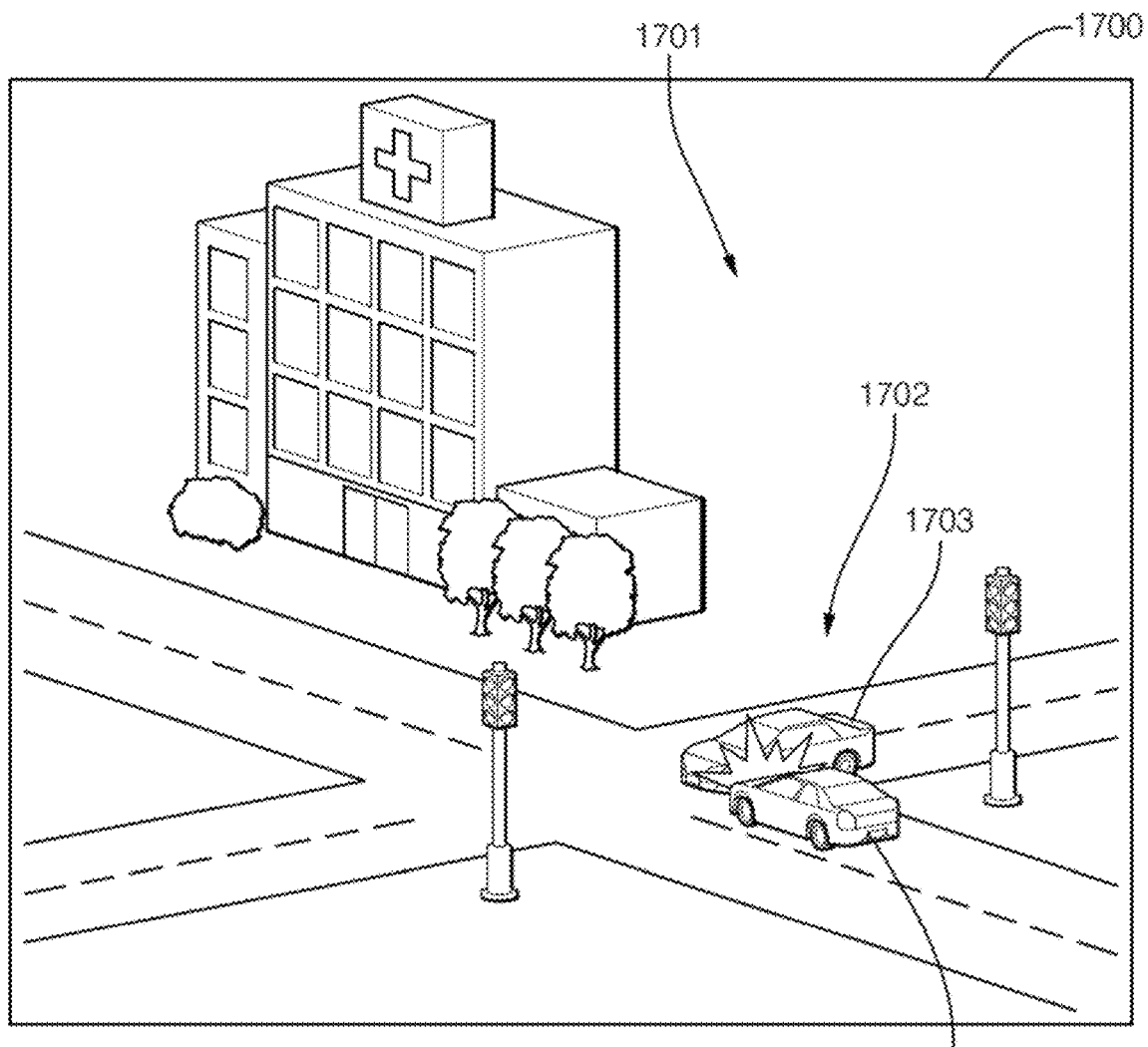
FIG. 17A shows a vision scene with acoustic information output by a vision-based acoustic localizer, in accordance with one or more embodiments.

FIG. 17A shows a vision scene 1700 with acoustic information output by the perception module 402 using acoustic localization, in accordance with one or more embodiments. The vision scene is generated based on the electromagnetic radiation sensor data from the electromagnetic radiation sensors 1308 of the AV 100. The vision scene 1700 shows an intersection 1701 and a detected accident 1704. The information associated with the detecting of the accident 1704 can include a level of confidence of the detection and the acoustic source information (e.g., location coordinates or street name of the accident 1704). In the example shown, the acoustic source information indicates that two vehicles have collided and a make and model of one of the vehicles 1703.

The addition of the acoustic source information allows the planning module 404 to make more informed prediction of the dynamic state of the operating environment 1300 than could otherwise be determined from the image data or the electromagnetic radiation sensors 1308. For example, without acoustic source information the planning module 404 is limited to avoiding the location of the accident 1704. However, the dynamic state of the operating environment 1300 can potentially change dramatically if an emergency vehicle is responding to the accident 1704. For example, the emergency vehicle responding to the accident 1704 can run the traffic light at the intersection 1701 or suddenly accelerate or turn. Additionally, any other vehicles at the intersection 1701 (not shown) would likely respond to the siren of the emergency vehicle responding to the accident 1704 and suddenly stop or pull to the side of the road to let the emergency vehicle pass. Accordingly, if the planning module 404 knows a siren is on, then the AV 100 can make an appropriate maneuver like a safe stop maneuver and pull to the side of the road.

Figure 17B:
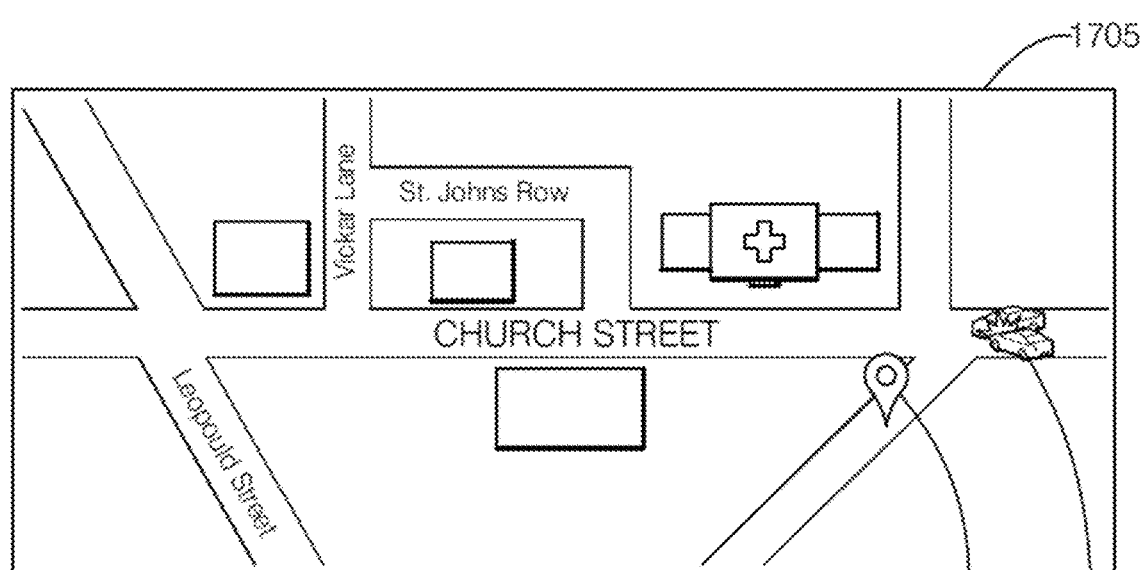
FIG. 17B shows a map augmented with acoustic source locations, in accordance with one or more embodiments.

FIG. 17B shows a digital map 1705 augmented with acoustic source locations, in accordance with one or more embodiments. In situations where an acoustic source is associated with a direction and a distance but is not in within the field of view of the electromagnetic radiation sensors 1308 of the AV 100, the planning module 404 uses the directions and distances of the acoustic sources to localize the acoustic sources in the digital map 1705. In the example shown, the accident 1704 is represented by marker 1706 and the AV 100 is represented by the marker 1707 in the digital map 1705. Accordingly, even though the acoustic source has not been detected by the perception module 402, the directions and distances computed using the beamformer system 1600 are provided to the planning module 404.

The locations of the acoustic sources in the digital map 1605 are used by the planning module 404 to predict the changes in dynamic states of other vehicles or pedestrians in response to the accident. For example, the planning module 404 can use the position, speed and direction of a responding emergency vehicle to generate a likely trajectory of the emergency vehicle responding to the accident 1704 in the operating environment 1300, and compare the trajectory with a trajectory for the AV 100 to avoid collision with the emergency vehicle responding to the accident 1704 or any other static or dynamic object in the environment. If traffic accident reports are available to AV 100 or a hospital is nearby (e.g., based on the static digital map 1705), then planning module 404 can use this additional acoustic information to more accurately predict the trajectory of an emergency vehicle responding to the accident 1704 in the operating environment 1300.

Although the example acoustic source described above is an accident, the disclosed system and method are used to localize any stationary or dynamic object 1008 in the operating environment 1300 for planning a route or trajectory of the AV 100 in the operating environment 1300 or for other purposes. For example, a construction zone is localized based on sound of heavy machinery or other distinctive construction site sounds (e.g., a jackhammer) and the planning module 404 can use this sound information to plan an alternate route to avoid the construction zone. Also, a localized grade crossing signal or draw-bridge alarm signal is used by planning module 404 together with the location of the AV 100, and the static digital map 1705, to determine if a train is approaching or if a draw-bridge is about to open, and then plan an alternate route or trajectory for the AV 100 to avoid waiting for the train or draw-bridge. In an embodiment, the distinctive sound of a large crowd is used with the static digital map 1705 and the location of the AV 100 to determine if the trajectory or route of the AV 100 will be impeded by a crowd leaving an arena (e.g., a sporting event, concert) or a parade, etc., and then plan an alternative route or trajectory to avoid the crowd, parade and resulting traffic jams.

Processes for Operation Using Multiple Motion Constraints

Figure 18:
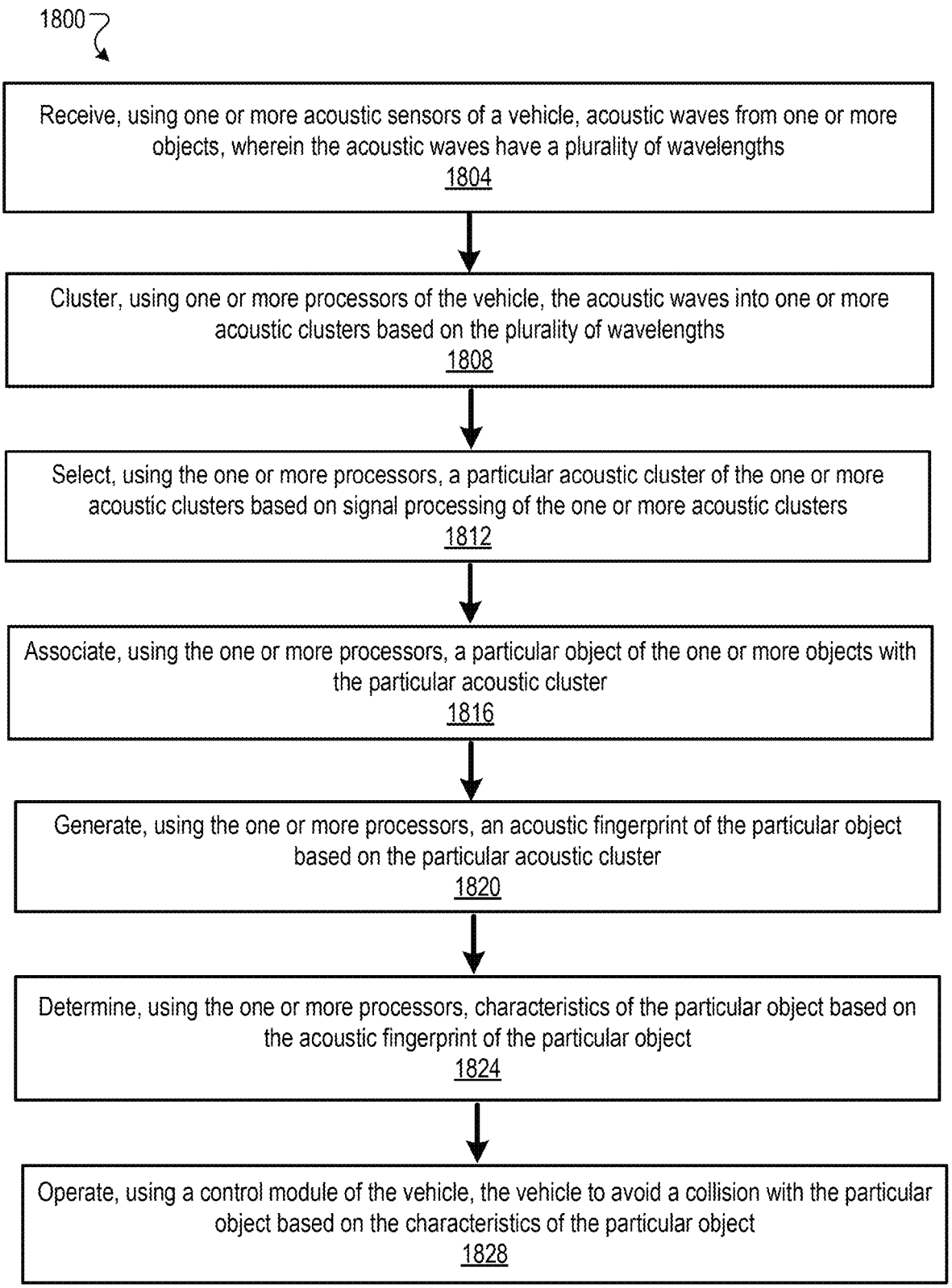

FIG. 18 shows a process 1800 for autonomous vehicle operation using acoustic modalities, in accordance with one or more embodiments. In one embodiment, the process of FIG. 18 is performed by the AV 100. Other entities, for example, one or more components of the remote server 136 perform some or all of the steps of the process 1800 in other embodiments. Likewise, embodiments may include different and/or additional steps, or perform the steps in different orders.

The AV 100 receives 1804 acoustic waves (e.g., the acoustic waves 1404) from one or more objects (e.g., the objects 1008) using one or more acoustic sensors (e.g., the acoustic sensors 1304) of the AV 100. The acoustic waves 1404 have multiple wavelengths. The acoustic waves are sound waves, e.g., emitted, reflected, or refracted by the one or more objects 1008 transmitted via the air in the operating environment 1300. The acoustic sensors 1304 are transducers that convert the acoustic waves into acoustic sensor data. For example, an acoustic sensor 1304 is a microphone and the acoustic sensor data are electrical signals representing the acoustic waves received by the microphone The AV 100 clusters 1808 the acoustic waves 1404 into one or more acoustic clusters based on the multiple wavelengths. In an embodiment, the perception module 402 clusters the acoustic waves by determining a change in a wavelength or a frequency of the acoustic waves based on filtering the acoustic waves. For example, the perception module 402 uses a gradient filter to filter the acoustic waves. The gradient filter determines discontinuities within the acoustic waves at which the properties of the acoustic waves change and outputs the filtered acoustic waves. The filtered acoustic waves are separated into the acoustic clusters at the regions of discontinuity.

The AV 100 selects 1812 a particular acoustic cluster of the one or more acoustic clusters based on signal processing of the one or more acoustic clusters. For example, the perception module 402 performs analog signal processing on the acoustic clusters using a passive filter, an active filter, or a voltage-controlled filter to separate the particular acoustic cluster. The perception module 402 performs continuous time filtering or discrete-time signal processing at discrete points in time to separate the particular acoustic cluster. The perception module 402 digitally processes the acoustic clusters using a digital circuit such as an ASIC, a field-programmable gate array, or a specialized digital signal processor (DSP chip), as illustrated and described above with reference to FIG. 3.

The AV 100 associates 1816 a particular object of the one or more objects 1008 with the particular acoustic cluster. In an embodiment, the AV 100 associates the particular object with the particular acoustic cluster by using a time difference of arrival method. For example, the acoustic sensors 1304 are used to identify the particular object by cross-correlating the acoustic sensor data between the acoustic sensors 1304. In an embodiment, the AV 100 associates the particular object with the particular acoustic cluster by triangulation of the particular object. By measuring the direction of the particular object at two or more locations in the operating environment 1300 while driving, the AV 100 triangulates the position of the particular object.

The AV 100 generates 1820 an acoustic fingerprint of the particular object based on the particular acoustic cluster. In an embodiment, the AV 100 generates the acoustic fingerprint by determining a zero crossing rate of the particular acoustic cluster. The zero-crossing rate is the rate of sign-changes along the acoustic waves associated with the particular object, e.g., the rate at which the acoustic waves change in magnitude from positive to zero to negative or from negative to zero to positive.

The AV 100 determines 1824 characteristics of the particular object based on the acoustic fingerprint of the particular object. In an embodiment, the characteristics include physical characteristics of the particular object. The AV 100 determines the characteristics of the particular object by generating a hash of peaks in a spectrogram of the acoustic waves. The hash of peaks is a function used to map the points of peak amplitude in the spectrogram onto hash values or hash codes.

The AV 100 operates 1828 the AV 100 using a control module (e.g., the control module 406) to avoid a collision with the particular object based on the characteristics of the particular object. The control module 406 operates the AV 100 to avoid a collision with the particular object identified by the perception module 402 based on the characteristics of the particular object. In an embodiment, the control module 406 operates the AV 100 to avoid a collision with the particular object based on the updated graphical representation of the operating environment 1300. For example, the updated graphical representation includes the spatiotemporal location of the particular object, and the control module 406 operates the AV 100 around the particular object.

Figure 19:
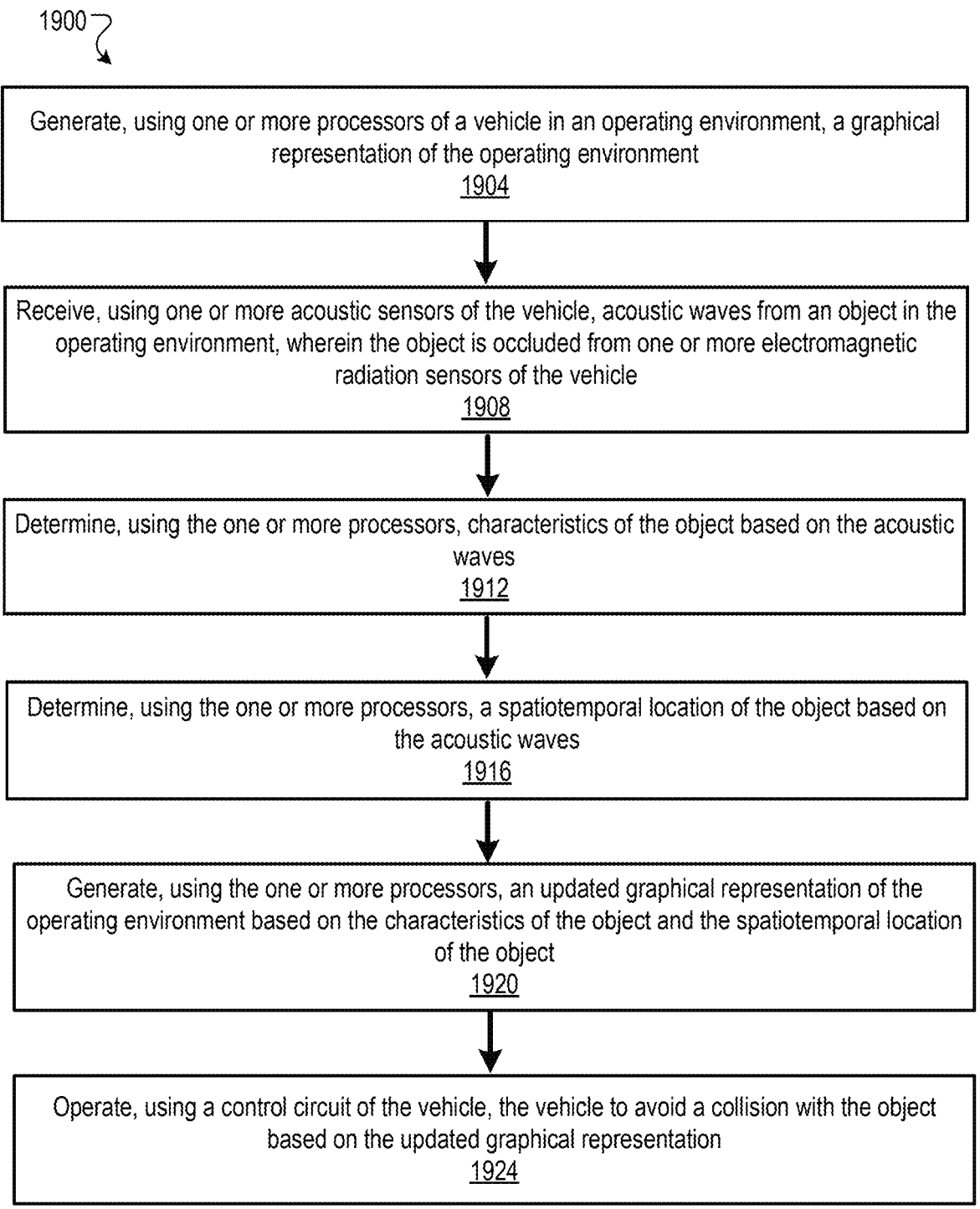

FIG. 19 shows a process 1900 for autonomous vehicle operation using acoustic modalities, in accordance with one or more embodiments. In one embodiment, the process of FIG. 19 is performed by the AV 100. Other entities, for example, one or more components of the remote server 136 perform some or all of the steps of the process 1900 in other embodiments. Likewise, embodiments may include different and/or additional steps, or perform the steps in different orders.

The AV 100 generates 1904 a graphical representation (e.g., the graph 1000) of an operating environment (e.g., the operating environment 1300). For example, the graph 1000 is generated using electromagnetic radiation sensor data received using electromagnetic radiation sensors (e.g., the electromagnetic radiation sensors 1308) of the AV 100. The graphical representation 1000 of the operating environment 1300 is used to drive a directed graph search for trajectory generation.

The AV 100 receives 1908 the acoustic waves 1404 from an object (e.g., the object 1008) in the operating environment using the one or more acoustic sensors 1304 of the AV 100. The object 1008 is occluded from the one or more electromagnetic radiation sensors 1308 of the AV 100. This could be because there is another object between the object 1008 and the electromagnetic radiation sensors 1308 or because of weather conditions such as fog, rain, or mist.

The AV 100 determines 1912 characteristics of the object 1008 based on the acoustic waves 1404. In an embodiment, the characteristics include physical characteristics of the object 1008. The perception module 402 determines the characteristics of the object 1008 by generating a hash of peaks in a spectrogram of the acoustic waves. The hash of peaks is a function used to map the points of peak amplitude in the spectrogram onto hash values or hash codes.

The AV 100 determines 1916 a spatiotemporal location of the object 1008 based on the acoustic waves 1404. For example, FIG. 16 above shows a beamforming system for localizing multiple acoustic sources. In an embodiment, the AV 100 determines the spatiotemporal location of the object 1008 by using a time difference of arrival method. In an embodiment, the AV 100 determines the spatiotemporal location of the object 1008 by triangulation of the object 1008. By measuring the direction of the object 1008 at two or more locations in the operating environment 1300 while driving, the AV 100 triangulates the position of the object 1008.

The AV 100 generates 1920 an updated graphical representation of the operating environment 1300 based on the characteristics of the object 1008 and the spatiotemporal location of the object 1008. In an embodiment, the AV 100 generates the updated graphical representation by performing sensor fusion using the one or more electromagnetic radiation sensors 1308 and the one or more acoustic sensors 1304 of the AV 100. The planning module 404 uses sensor fusion to combine the electromagnetic radiation sensor data and the acoustic sensor data for improving the trajectory generation. The sensor fusion reduces the deficiencies of the individual sensors to determine the position and orientation of the object 1008.

The AV 100 operates 1924 the AV 100 to avoid a collision with the object 1008 based on the updated graphical representation using a control circuit (e.g., the control module 406) of the AV 100. The control module 406 operates the AV 100 to avoid a collision with the object 1008 based on the characteristics of the object 1008. For example, the updated graphical representation includes the spatiotemporal location of the object 1008, and the control module 406 operates the AV 100 around the object 1008.

FIG. 20 shows a process 2000 for autonomous vehicle operation using acoustic modalities, in accordance with one or more embodiments. In one embodiment, the process of FIG. 20 is performed by the AV 100. Other entities, for example, one or more components of the remote server 136 perform some or all of the steps of the process 2000 in other embodiments. Likewise, embodiments may include different and/or additional steps, or perform the steps in different orders.

The AV 100 extracts 2004 a feature vector (e.g., the feature vector 1416) from the acoustic waves 1404 received using the one or more acoustic sensors 1304 of the AV 100. The feature vector 1416 is a compact representation of the information in the acoustic waves 1404 and is used as input by the machine learning module 1312. For example, the AV 100 extracts the feature vector 1416 by determining a zero crossing rate of the acoustic waves 1404. A feature thus represents the zero crossing rate of the acoustic waves 1404. Zero crossing rate is described in more detail above with reference to FIG. 13.

The AV 100 transmits 2008 the feature vector 1416 to a machine learning module (e.g., the machine learning module 1312) of the AV 100. The machine learning module 1312 is trained to receive one or more features and generate a score indicative of a probability that the one or more features indicate an emergency. For example, the score is between 0% and 100%. For example, the emergency is associated with an audio siren produced by an emergency vehicle, a sound of an explosion, a sound of an accident, gunshot sounds, or a sound of people shouting or crying. The machine learning module 1312 is trained to receive features and generate a score (e.g., the output 1428) indicative of a probability that the features indicate an emergency.

Responsive to the score being greater than a threshold value, the AV 100 identifies 2012, using the machine learning module 1312, a type of the emergency based on the feature vector 1416. For example, if the threshold value is 75% and the score is 80%, the AV 100 will identify the type of the emergency. The machine learning module 1312 identifies the type of the emergency by matching the feature vector 1416 to a database. For example, the database includes a look-up table of types of emergencies indexed by feature vectors 1416 and is stored in the data storage unit 142 or remote server 136. The types of the emergency include an explosion, a fire, an accident, a siren from an emergency vehicle, a sound of people shouting or crying, gunshot sounds, a combination thereof, or another type of emergency that is identified using acoustic waves 1404.

The AV 100 retrieves 2016 an operation for the AV 100 based on the type of the emergency. For example, the AV 100 receives one or more images using one or more visual sensors of the AV 100. The AV 100 transmits the one or more images to the remote server 136 such that the remote server 136 performs a teleoperation or reports the emergency to law enforcement or emergency services.

The AV 100 operates 2020 in accordance with the operation using the control module 406 of the AV 100. The control module 406 operates the AV 100 toward a source of the acoustic waves 1404 if the determined type of the emergency indicates no threat to the passengers in the AV 100 or the AV 100 itself. For example, if the AV 100 identifies a wounded person, the control module 406 operates the AV 100 toward a source of the acoustic waves 1404. In an embodiment, the loudspeaker 1320 of the AV 100 broadcasts an audio message toward the source of the acoustic waves 1404. For example, the audio message includes a telephone number to call for help, state that "There is a Police Station 1 mile Away," or state that "The Police Are on the Way."

Additional Embodiments

In an embodiment, one or more acoustic sensors of a vehicle receive acoustic waves from one or more objects. The acoustic waves have multiple wavelengths. One or more processors of the vehicle cluster the acoustic waves into one or more acoustic clusters based on the multiple wavelengths. The one or more processors select a particular acoustic cluster of the one or more acoustic clusters based on signal processing of the one or more acoustic clusters. The one or more processors associate a particular object of the one or more objects with the particular acoustic cluster. The one or more processors generate an acoustic fingerprint of the particular object based on the particular acoustic cluster. The one or more processors determine characteristics of the particular object based on the acoustic fingerprint of the particular object. A control circuit of the vehicle operates the vehicle to avoid a collision with the particular object based on the characteristics of the particular object.

In an embodiment, the determining of the physical characteristics includes determining dimensions of the particular object of the one or more objects.

In an embodiment, the one or more processors, determine whether the particular object of the one or more objects is an inactive vehicle based on the acoustic fingerprint.

In an embodiment, the one or more processors determine whether the particular object of the one or more objects is a vehicle that has a running engine based on the acoustic fingerprint.

In an embodiment, one or more processors of a vehicle in an operating environment generate a graphical representation of the operating environment. One or more acoustic sensors of the vehicle receive acoustic waves from an object in the operating environment. The object is occluded from one or more electromagnetic radiation sensors of the vehicle. The one or more processors determine characteristics of the object based on the acoustic waves. The one or more processors determine a spatiotemporal location of the object based on the acoustic waves. The one or more processors generate an updated graphical representation of the operating environment based on the characteristics of the object and the spatiotemporal location of the object. A control circuit of the vehicle operates the vehicle to avoid a collision with the object based on the updated graphical representation.

In an embodiment, the one or more electromagnetic radiation sensors receive electromagnetic radiation sensor data.

In an embodiment, the graphical representation of the operating environment is generated based on the electromagnetic radiation sensor data.

In an embodiment, the one or more processors determine a blind spot of the vehicle. The blind spot includes a spatiotemporal location of the operating environment that is invisible to the one or more electromagnetic radiation sensors of the vehicle.

In an embodiment, the one or more processors determine whether the spatiotemporal location of the particular object corresponds to the blind spot of the vehicle.

In an embodiment, the generating of the updated graphical representation includes performing sensor fusion using the one or more electromagnetic radiation sensors and the one or more acoustic sensor of the vehicle.

In an embodiment, the one or more processors identify a failure in the one or more electromagnetic radiation sensors.

In an embodiment, the one or more processors generate a trajectory for the vehicle based on the acoustic waves.

In an embodiment, the one or more processors detect a change in a frequency of the acoustic waves.

In an embodiment, the one or more processors determine a speed of the object relative to the vehicle based on the change in the frequency.

In an embodiment, the one or more processors detect a change in a wavelength of the acoustic waves.

In an embodiment, the one or more processors determine a speed of the object relative to the vehicle based on the change in the wavelength.

In an embodiment, the one or more processors generate a trajectory for the vehicle to avoid a collision with the object based on the speed of the object relative to the vehicle.

In an embodiment, the one or more acoustic sensors determine multiple intensities of the acoustic waves based on relative positions of the one or more acoustic sensors.

In an embodiment, the one or more processors determine a directional orientation of the object.

In an embodiment, each acoustic sensor of the one or more acoustic sensors is located at a respective position on the vehicle.

In an embodiment, the one or more processors determine a level of confidence in identifying a second object in the operating environment based on the electromagnetic radiation sensor data received using the one or more electromagnetic radiation sensors.

In an embodiment, responsive to the level of confidence being less than a threshold value, the one or more processors determine physical characteristics of the second object based on acoustic waves received from the second object to increase the level of confidence.

In an embodiment, the one or more processors determine that the object is a building based on the physical characteristics and the spatiotemporal location.

In an embodiment, the one or more processors identify a side of the building that the vehicle is located on based on the physical characteristics.

In an embodiment, the one or more processors determine that the vehicle is located on a boundary of a map of the operating environment.

In an embodiment, the one or more processors generate a hypothetical vehicle corresponding to the particular object, wherein the hypothetical vehicle is located outside the map.

In an embodiment, the one or more processors increase a level of aggressiveness in operation of the vehicle based on the location of the hypothetical vehicle.

In an embodiment, the one or more processors determine a level of confidence in the generation of the hypothetical vehicle.

In an embodiment, the one or more processors adjust weights of a graphical representation of the operating environment based on the location of the hypothetical vehicle.

In an embodiment, the one or more processors generate a trajectory for the vehicle based on the adjusted graphical representation.

In an embodiment, one or more processors of a vehicle extract a feature vector from acoustic waves received using one or more acoustic sensors of the vehicle. The one or more processors transmit the feature vector to a machine learning module of the vehicle. The machine learning module is trained to receive one or more features and generate a score indicative of a probability that the one or more features indicate an emergency. Responsive to the score being greater than a threshold value, the machine learning module is used to identify a type of the emergency based on the feature vector. The one or more processors retrieve an operation for the vehicle based on the type of the emergency. A control circuit of the vehicle operates the vehicle in accordance with the operation.

In an embodiment, the one or more processors receive a map of an operating environment in which the vehicle is located. The map includes an acoustic fingerprint.

In an embodiment, the one or more processors compare the acoustic fingerprint to the feature vector.

In an embodiment, a message representing the type of the emergency is transmitted to an emergency vehicle.

In an embodiment, responsive to the score being greater than a threshold value, one or more acoustic transmitters of the vehicle emit ultrasound signals.

In an embodiment, the one or more acoustic sensors receive reflected ultrasound signals from the operating environment in which the vehicle is located.

In an embodiment, the emergency is detected based on the reflected ultrasound signals.

In an embodiment, the detecting of the emergency based on the reflected ultrasound signals is performed by the machine learning module.

In an embodiment, the identifying of the type of the emergency includes matching the feature vector to a database.

In an embodiment, responsive to the score being greater than a threshold value, a message representing the emergency is transmitted to a server.

In an embodiment, instructions for performing the operation are received from a server.

In an embodiment, responsive to the score being greater than a threshold value, one or more visual sensors of the vehicle receive one or more images.

In an embodiment, the one or more processors transmit the one or more images to a server.

In an embodiment, responsive to the score being greater than a threshold value, the control circuit operates the vehicle toward a source of the acoustic waves.

In an embodiment, a loudspeaker of the vehicle broadcasts a message toward the source of the acoustic waves.

In an embodiment, a display device of the vehicle presents a message to the source of the acoustic waves.

In an embodiment, the control circuit unlocks a door of the vehicle.

In an embodiment, a map of the operating environment in which the vehicle is located is annotated with the feature vector.

In an embodiment, a training set including labeled features representing an emergency is received.

In an embodiment, the one or more processors train the machine learning module to receive the labeled features and generate a score indicative of a probability that the labeled features indicate the emergency.

In an embodiment, the extracting of the feature vector includes determining, using the one or more processors, a zero crossing rate of the acoustic waves.

In an embodiment, the extracting of the feature vector includes determining, using the one or more processors, a spectral density of the acoustic cluster of the one or more acoustic clusters.

In an embodiment, the extracting of the feature vector includes determining, using the one or more processors, a spectral flatness of the acoustic waves.

In an embodiment, the extracting of the feature vector includes determining, using the one or more processors, peaks in a spectrogram of the acoustic waves.

In an embodiment, the extracting of the feature vector includes determining, using the one or more processors, an acoustic pressure of the acoustic waves.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further including," in the foregoing description or following claims, what follows this phrase can be an additional step or entity, or a sub-step/sub-entity of a previously-recited step or entity.

What is claimed is:

1. A method comprising:
    receiving, using one or more acoustic sensors of a vehicle, acoustic waves from two or more objects, wherein the acoustic waves have a plurality of wavelengths;
    clustering, using one or more processors of the vehicle, the acoustic waves into two or more acoustic clusters based on the plurality of wavelengths;
    selecting, using the one or more processors, a particular acoustic cluster of the two or more acoustic clusters based on signal processing of the two or more acoustic clusters;
    associating, using the one or more processors, a particular object of the two or more objects with the particular acoustic cluster;
    generating, using the one or more processors, an acoustic fingerprint of the particular object based on the particular acoustic cluster;
    determining, using the one or more processors, characteristics of the particular object based on the acoustic fingerprint of the particular object; and
    operating, using a control circuit of the vehicle, the vehicle to avoid a collision with the particular object based on the characteristics of the particular object.

2. The method of claim 1, wherein each acoustic cluster of the ene two or more acoustic clusters corresponds to a respective object of the one two or more objects.

3. The method of claim 1, wherein the clustering of the acoustic waves comprises determining, using the one or more processors, a change in a wavelength or a frequency of the acoustic waves based on filtering the acoustic waves.

4. The method of claim 3, wherein the filtering of the acoustic waves is performed using a gradient filter.

5. The method of claim 1, wherein the clustering of the acoustic waves comprises splitting, using the one or more processors, the acoustic waves into the two or more acoustic clusters based on a spectrogram.

6. The method of claim 1, wherein the clustering of the acoustic waves comprises splitting, using the one or more processors, the acoustic waves into the two or more acoustic clusters based on a time-frequency graph.

7. The method of claim 1, wherein the generating of the acoustic fingerprint comprises determining, using the one or more processors, a zero crossing rate of the particular acoustic cluster of the two or more acoustic clusters.

8. The method of claim 1, wherein the generating of the acoustic fingerprint comprises determining, using the one or more processors, a spectral density of the particular acoustic cluster of the two or more acoustic clusters.

9. The method of claim 1, wherein the generating of the acoustic fingerprint comprises determining, using the one or more processors, a spectral flatness of the particular acoustic cluster of the two or more acoustic clusters.

10. The method of claim 1, wherein the generating of the acoustic fingerprint comprises determining, using the one or more processors, peaks in a spectrogram of the particular acoustic cluster of the two or more acoustic clusters.

11. The method of claim 1, wherein the generating of the acoustic fingerprint comprises determining, using the one or more processors, an acoustic pressure of the particular acoustic cluster of the two or more acoustic clusters.

12. The method of claim 1, wherein the generating of the acoustic fingerprint comprises determining, using the one or more processors, a particle velocity of the particular acoustic cluster of the two or more acoustic clusters.

13. The method of claim 1, wherein the generating of the acoustic fingerprint comprises determining, using the one or more processors, a particle displacement of the particular acoustic cluster of the two or more acoustic clusters.

14. The method of claim 1, wherein the generating of the acoustic fingerprint comprises determining, using the one or more processors, an acoustic intensity of the particular acoustic cluster of the two or more acoustic clusters.

15. The method of claim 1, wherein the acoustic waves are diffracted, reflected, or interfered with by the particular object of the two or more objects.

16. The method of claim 1, further comprising filtering, using the one or more processors, the acoustic waves based on peaks in a spectrogram of the acoustic waves to remove background noise.

17. The method of claim 1, wherein the characteristics comprise physical characteristics of the particular object, and wherein the determining of the physical characteristics comprises generating, using the one or more processors, a hash of peaks in a spectrogram of the acoustic waves.

18. The method of claim 17, wherein the determining of the physical characteristics further comprises searching, using the one or more processors, a database based on the hash of peaks to determine the physical characteristics.

19. A vehicle comprising:
    one or more computer processors; and
    one or more non-transitory storage media storing instructions which, when executed by the one or more computer processors, cause the one or more computer processors to:
        receive, using one or more acoustic sensors of a vehicle, acoustic waves from two or more objects, wherein the acoustic waves have a plurality of wavelengths;
        cluster the acoustic waves into two or more acoustic clusters based on the plurality of wavelengths;
        select a particular acoustic cluster of the two or more acoustic clusters based on signal processing of the two or more acoustic clusters;
        associate a particular object of the two or more objects with the particular acoustic cluster;
        generate an acoustic fingerprint of the particular object based on the particular acoustic cluster;

determine characteristics of the particular object based on the acoustic fingerprint of the particular object; and operate, using a control circuit of the vehicle, the vehicle to avoid a collision with the particular object based on the characteristics of the particular object.

20. One or more non-transitory storage media storing instructions which, when executed by one or more computing devices, cause the one or more computing devices to:

receive, using one or more acoustic sensors of a vehicle, acoustic waves from two or more objects, wherein the acoustic waves have a plurality of wavelengths;

cluster the acoustic waves into two or more acoustic clusters based on the plurality of wavelengths;

select a particular acoustic cluster of the two or more acoustic clusters based on signal processing of the two or more acoustic clusters;

associate a particular object of the two or more objects with the particular acoustic cluster;

generate an acoustic fingerprint of the particular object based on the particular acoustic cluster;

determine characteristics of the particular object based on the acoustic fingerprint of the particular object; and operate, using a control circuit of the vehicle, the vehicle to avoid a collision with the particular object based on the characteristics of the particular object.

* * * * *